US012677265B2

(12) United States Patent
Zhang et al.

(10) Patent No.: US 12,677,265 B2
(45) Date of Patent: Jul. 7, 2026

(54) FREQUENCY DOMAIN COMPONENT REPORTING METHOD AND APPARATUS

(71) Applicant: Huawei Technologies Co., Ltd., Shenzhen (CN)

(72) Inventors: Didi Zhang, Shenzhen (CN); Shibin Ge, Shanghai (CN); Yongping Zhang, Beijing (CN); Yiling Yuan, Shanghai (CN); Junhui Gao, Shanghai (CN); Li Fan, Shanghai (CN); Huangping Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 193 days.

(21) Appl. No.: 18/620,135

(22) Filed: Mar. 28, 2024

(65) Prior Publication Data

US 2024/0244606 A1 Jul. 18, 2024

Related U.S. Application Data

(63) Continuation of application No. PCT/CN2022/120249, filed on Sep. 21, 2022.

(30) Foreign Application Priority Data

Sep. 30, 2021 (CN) .......................... 202111162852.7

(51) Int. Cl.
*H04W 72/0453* (2023.01)

(52) U.S. Cl.
CPC ................................ *H04W 72/0453* (2013.01)

(58) Field of Classification Search
CPC . H04W 72/0453; H04W 72/23; H04W 72/21; H04W 24/10; H04W 72/0446;
(Continued)

(56) References Cited

U.S. PATENT DOCUMENTS

2019/0021045 A1* 1/2019 Kim ...................... H04W 72/23
2019/0349115 A1* 11/2019 Lin ................... H04W 72/0446
(Continued)

FOREIGN PATENT DOCUMENTS

WO 2020221118 A1 11/2020
WO 2020258043 A1 12/2020
(Continued)

OTHER PUBLICATIONS

3GPP TS 38.214 V16.7.0, 3rd Generation Partnership Project; Technical Specification Group Radio Access Network; NR; Physical layer procedures for data (Release 16), Sep. 2021, total 172 pages.
(Continued)

*Primary Examiner* — Nimesh Patel
(74) *Attorney, Agent, or Firm* — Slater Matsil, LLP

(57) ABSTRACT

In accordance with an embodiment, a method includes obtaining $M_v$ frequency domain components, where the $M_v$ frequency domain components are a subset of N candidate frequency domain components, and $M_v$ is a positive integer; and sending first indication information, where the first indication information indicates the $M_v$ frequency domain components, the first indication information occupies $$\left\lceil \log_2 \binom{N-1}{M_v-1} \right\rceil$$

bits, and N is a positive integer greater than $M_v$.

21 Claims, 4 Drawing Sheets

Terminal device

Radio access network device

S400: Obtain N candidate frequency domain components

S401: Obtain $M_v$ frequency domain components

S402: First indication information, indicating the $M_v$ frequency domain components

(58) Field of Classification Search
CPC ............... H04W 72/232; H04W 72/04; H04W 72/1268; H04W 72/51; H04W 72/046; H04W 72/12; H04W 72/231; H04W 72/20; H04W 72/1263; H04W 72/02; H04W 72/044; H04W 48/12; H04W 52/42; H04W 72/30; H04W 72/52; H04W 72/541; H04W 84/042; H04W 16/10; H04W 16/28; H04W 28/06; H04W 28/10; H04W 28/16; H04W 72/563; H04W 74/0838; H04W 84/12; H04W 28/20; H04W 52/265; H04W 16/08; H04W 16/18; H04W 74/004; H04W 72/56; H04W 72/543; H04W 72/542; H04W 72/53; H04B 7/0478; H04B 7/0626; H04B 7/0617; H04B 7/0632; H04B 7/0413; H04B 7/0417; H04B 7/0628; H04B 7/06952; H04B 1/713; H04B 7/0404; H04B 7/0408; H04B 1/7115; H04B 17/309; H04B 7/0619; H04B 7/0452; H04B 7/0695; H04B 7/0691; H04B 17/24; H04B 7/0636; H04B 7/06958; H04B 7/0874; H04B 7/212; H04B 7/2621; H04L 5/0053; H04L 5/0094; H04L 5/001; H04L 5/0048; H04L 5/0051; H04L 1/0026; H04L 5/0057; H04L 5/0044; H04L 5/0007; H04L 1/1812; H04L 5/0023; H04L 5/14; H04L 1/1861; H04L 5/1469; H04L 5/0012; H04L 1/1614; H04L 5/0025; H04L 5/0032; H04L 5/0039; H04L 5/0046; H04L 5/0058; H04L 5/0073; H04L 1/06; H04L 27/2601; H04L 41/0803; H04L 5/0016; H04L 5/006; Y02D 30/70; G01S 5/0236; G01S 5/0252; G01S 1/024; G01S 1/0428; G01S 11/02; G01S 13/343; G01S 2013/9316; G01S 2205/008; G01S 5/0045; G01S 5/0009; G01S 5/011; H04J 11/00; H04J 11/0053; H04J 11/0023; H04J 13/004; H04J 13/10; H04J 13/16; H04J 2011/0006; H04J 2211/005
See application file for complete search history.

(56) References Cited

U.S. PATENT DOCUMENTS

| | | | | | |
|---|---|---|---|---|---|
| 2021/0028846 | A1* | 1/2021 | Tosato | ................. | H04B 7/0639 |
| 2021/0105783 | A1* | 4/2021 | Wang | .................... | H04L 5/0044 |
| 2021/0337517 | A1* | 10/2021 | Li | ........................... | H04W 8/24 |
| 2024/0137082 | A1* | 4/2024 | Shi | ....................... | H04B 7/0456 |

FOREIGN PATENT DOCUMENTS

| | | | |
|---|---|---|---|
| WO | 2020258518 | A1 | 12/2020 |
| WO | 2021159537 | A1 | 8/2021 |

OTHER PUBLICATIONS

Ericsson: "On CSI enhancements for MU-MIMO", 3GPP Draft; R1-1909379 On CSI Enhancements for MU-MIMO, 3rd Generation Partnership Project (3GPP), Mobile Competence Centre;650, Route Des Lucioles; F-06921Sophia-Antipolis Cedex; France vol. RAN WG1, No. Prague, Czech Republic; Aug. 26, 2019-2019083016 Aug. 2019 (Aug. 16, 2019), X 5176596, pp. 1-27.

ZTE: "CSI Enhancement for MU-MIMO Support", 3GPP Draft; R1-1908190 CSI Enhancement for MU-MIMO Support, 3rd Generation Partnership Project (3GPP), Mobile Competence Centre ; 650, Route Deslucioles; F-06921 Sophia-Antipolis Cedex; FRANCEvol. RAN WG1, No. Prague, CZ; 201908262019083017 Aug. 2019 (Aug. 17, 2019), XP051764809, total 16 pages.

* cited by examiner

700

FREQUENCY DOMAIN COMPONENT REPORTING METHOD AND APPARATUS

CROSS-REFERENCE TO RELATED APPLICATIONS

This application is a continuation of International Application No. PCT/CN2022/120249, filed on Sep. 21, 2022, which claims priority to Chinese Patent Application No. 202111162852.7, filed on Sep. 30, 2021. The disclosures of the aforementioned applications are hereby incorporated by reference in their entireties.

TECHNICAL FIELD

This application relates to the field of wireless communication technologies, and in particular, to a frequency domain component reporting method and an apparatus.

BACKGROUND

In a frequency division duplex (FDD) system, some information has reciprocity between an uplink channel and a downlink channel. Therefore, a terminal device may feed back, to a radio access network device, non-reciprocity information, for example, index information of a frequency domain component selected by the terminal device. The radio access network device may determine, by using the non-reciprocity information between the uplink and downlink channels and the reciprocity information between the uplink and downlink channels, a precoding matrix corresponding to downlink data transmission, for downlink data transmission.

Currently, when feeding back indication information of the frequency domain component, the terminal device selects $M_v$ vectors from N consecutive frequency domain components, and indicates, to the access network device, the selected frequency domain components using $$\log_2 \binom{N}{M_v}$$

bits. For example, when $M_v=2$, $N=4$, there are six possible selection manners in total, and three bits of information are needed by the terminal device for indication. However, in a plurality of frequency domain component selection manners, the radio access network device may determine precoding matrices having a same coding effect. Therefore, when the terminal device indicates each frequency domain component selection manner, there are unnecessary feedback overheads for the indication information of the frequency domain component.

SUMMARY

This application provides a frequency domain component reporting method and an apparatus, to reduce feedback overheads of frequency domain component indication.

According to a first aspect, a frequency domain component reporting method is provided, including the following process: A terminal device obtains $M_v$ frequency domain components. The $M_v$ frequency domain components are a subset of N candidate frequency domain components, $M_v$ is a positive integer, and N is a positive integer greater than or equal to $M_v$. For example, the terminal device may select the $M_v$ frequency domain components from the N candidate frequency domain components. The N candidate frequency domain components may be N consecutive candidate frequency domain components, in other words, any two adjacent frequency domain components in the N candidate frequency domain components have a fixed phase offset. Optionally, the radio access network device may indicate a quantity $M_v$ of reported frequency domain components to the terminal device.

The terminal device sends first indication information. The first indication indicates the $M_v$ frequency domain components, the first indication information occupies $$\left\lceil \log_2 \binom{N-n}{M_v - n} \right\rceil$$

bits, and n is a positive integer less than $M_v$. In this way, the terminal device may indicate the frequency domain component by using fewer bits. This reduces feedback overheads.

$$\binom{N-n}{M_v - n}$$

indicates that $(M_v-n)$ values are selected from $(N-n)$ values, and $(N-n)$ may be $(N-n)$ frequency domain components, or may be $(N-n)$ types of frequency domain component sets.

In the method, considering that $M_v$ different frequency domain components may enable the radio access network device to determine precoding matrices having a same coding effect, the $M_v$ frequency domain components may be indicated by using a same bit value. This reduces the feedback overheads of the frequency domain component.

For example, the n frequency domain components in the $M_v$ frequency domain components may be reported by default, to be specific, n may be a quantity of frequency domain components selected by default from the N candidate frequency domain components. For example, one frequency domain component is selected by default for reporting, n is 1, and the first indication information occupies $$\left\lceil \log_2 \binom{N-1}{M_v - 1} \right\rceil$$

bits. The frequency domain component selected by default may be a frequency domain component at a start location, a frequency domain component at an end location, a frequency domain component with a specific value, or the like in the N candidate frequency domain components. The n frequency domain components selected by default do not need to be indicated by an additional bit, so that the feedback overheads of the frequency domain component are reduced. Alternatively, the terminal device directly reports the frequency domain component set in which the $M_v$ frequency domain components are located, so that occupied bit overheads and the feedback overheads of the frequency domain component can be reduced.

In a possible design, $M_v$ is 1, and N is 1 or 2.

In a possible design, $M_v$ is 2, and N is one of 2, 3, 4, or 5.

In a possible design, the N candidate frequency domain components include a plurality of types of frequency domain component sets, frequency domain component subsets in each type of frequency domain component set are equivalent for reconstructing a precoding matrix by the radio access network device, and each frequency domain component subset includes the $M_v$ frequency domain components. By classifying the candidate frequency domain components, frequency domain component indication overheads can be further reduced.

In this design, different frequency domain component subsets are equivalent for reconstructing the precoding matrix by the radio access network device. In other words, the radio access network device obtains a precoding matrix having a same coding effect by reconstructing the different frequency domain component subsets.

In a possible design, when N is 2, the terminal device may directly use the N candidate frequency domain components as the $M_v$ frequency domain components. When $M_v$=N, the terminal device selects all the N candidate frequency domain components, and the terminal device may not report the $M_v$ selected frequency domain components. When $M_v$=N, the radio access network device may consider by default that the terminal device selects all the N frequency domain components.

In a possible design, when N is 3, the following manner may be used for indication.

The first indication information indicates two frequency domain components using one bit, and one of the frequency domain components is a frequency domain component at a start location or an end location of the N candidate frequency domain components.

Alternatively, the first indication information indicates two frequency domain components using one bit, and one of the frequency domain components is a frequency domain component of a specified value.

Alternatively, the first indication information indicates each type of frequency domain component set using one bit.

In this design, when $M_v$ is 2 and N is 3, one frequency domain component may be reported by default, and the other one of the $M_v$ frequency domain components may be indicated by using one bit; or the candidate frequency domain components are classified and combined into two types of frequency domain component sets, and the two types of frequency domain component sets may be indicated by using one bit, so that a frequency domain component feedback message can be reduced.

In a possible design, when N is 4 or 5, the following manner may be used for indication.

The first indication information indicates two frequency domain components using two bits, and one of the frequency domain components is a frequency domain component at a start location or an end location of the N candidate frequency domain components.

Alternatively, the first indication information indicates two frequency domain components using two bits, and one of the frequency domain components is a frequency domain component of a specified value.

Alternatively, the first indication information indicates each type of frequency domain component set using two bits.

In this design, when $M_v$ is 2 and N is 4 or 5, one frequency domain component may be reported by default, and the other one of the $M_v$ frequency domain components may be indicated by using two bits; or the candidate frequency domain components are classified and combined into three or four types of frequency domain component sets, and the three or four types of frequency domain component sets may be indicated by using one bit, so that a frequency domain component feedback message can be reduced.

When $M_v$ is greater than 2, the first indication information may indicate the $M_v$ frequency domain components using more bits (for example, more than one bit or two bits). Examples are not described herein one by one.

In a possible design, the first indication information is carried in precoding matrix indication information PMI.

Optionally, the precoding matrix indication information is carried by using uplink control information UCI. The UCI may be used by the terminal device to feed back downlink channel state information.

In a possible design, the terminal device sends a strongest non-zero coefficient in weighting coefficients corresponding to the $M_v$ frequency domain components. A priority corresponding to the strongest non-zero coefficient is the highest. In this design, the terminal device may preferentially report the strongest non-zero coefficient, so that the priority of the strongest non-zero coefficient is the highest.

Optionally, the strongest non-zero coefficient may be carried by using the uplink control information.

In a possible design, before the terminal device obtains the $M_v$ frequency domain components, the terminal device may further report capability information of the terminal device. The capability information of the terminal device includes a codebook combination supported by the terminal device, and the codebook combination is used to determine a value of $M_v$. The terminal device may further receive second indication information. The second indication information indicates the value of $M_v$.

The radio access network device determines the value of $M_v$ based on the codebook combination supported by the terminal device.

In a possible design, the capability information of the terminal device further includes a maximum value of $M_v$ supported by the terminal device, and the value of $M_v$ indicated by the second indication information is less than or equal to the maximum value of $M_v$.

In a possible design, the codebook combination includes one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2. In this design, the terminal device may support more codebook types.

In a possible manner, the second indication information indicates the value of $M_v$ by indicating a selected codebook type. For example, the second indication information indicates a codebook type FeType2Mv1, representing that the value of $M_v$ supported by the terminal device in a codebook of a FeType2 type is 1. For another example, the second indication information indicates a codebook type FeType2Mv2, representing that the value of $M_v$ supported by the terminal device in a codebook of a FeType2 type is 2. For another example, the second indication information indicates a codebook type FeType2, representing that the terminal device supports all possible values of $M_v$ by default in a codebook of a FeType2 type.

According to a second aspect, a frequency domain component reporting method is provided, including the following process: A radio access network device receives first indication information. The first indication information indicates $M_v$ frequency domain components, the $M_v$ frequency domain components are a subset of N candidate frequency domain components, $M_v$ is a positive integer, the first indication information occupies $$\left\lceil \log_2 \binom{N-n}{M_v-n} \right\rceil$$

bits, N is a positive integer greater than or equal to $M_v$, and n is a positive integer less than $M_v$.

The radio access network device determines the $M_v$ frequency domain components.

For example, when n is 1, the first indication information occupies $$\left\lceil \log_2 \binom{N-1}{M_v-1} \right\rceil$$

bits.

In a possible design, $M_v$ is 2.

In a possible design, N is one of 2, 3, 4, or 5.

In a possible design, the N candidate frequency domain components include a plurality of types of frequency domain component sets, frequency domain component subsets in a same type of frequency domain component set are equivalent for reconstructing a precoding matrix by the radio access network device, and each frequency domain component subset includes the $M_v$ frequency domain components.

In a possible design, when N is 3, the first indication information indicates two frequency domain components using one bit, and one of the frequency domain components is a frequency domain component at a start location or an end location of the N candidate frequency domain components;

the first indication information indicates two frequency domain components using one bit, and one of the frequency domain components is a frequency domain component of a specified value; or the first indication information indicates each type of frequency domain component set using one bit.

In a possible design, when N is 4 or 5, the first indication information indicates two frequency domain components using two bits, and one of the frequency domain components is a frequency domain component at a start location or an end location of the N candidate frequency domain components;

the first indication information indicates two frequency domain components using two bits, and one of the frequency domain components is a frequency domain component of a specified value; or the first indication information indicates each type of frequency domain component set using two bits.

In a possible design, the first indication information is carried in precoding matrix indication PMI information, and the PMI information is carried in UCI.

In a possible design, the radio access network device receives a strongest non-zero coefficient in weighting coefficients corresponding to the $M_v$ frequency domain components. A priority corresponding to the strongest non-zero coefficient is the highest.

In a possible design, before the radio access network device receives the first indication information, the radio access network device may further receive capability information of a terminal device. The capability information of the terminal device includes a codebook combination supported by the terminal device, and the codebook combination is used to determine a value of $M_v$. The radio access network device may further send second indication information. The second indication information indicates the value of $M_v$.

In a possible design, the capability information of the terminal device further includes a maximum value of $M_v$ supported by the terminal device, and the value of $M_v$ indicated by the second indication information is less than or equal to the maximum value of $M_v$.

In a possible design, the codebook combination includes one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

According to a third aspect, a communication method is provided. In the method, a terminal device may report capability information of the terminal device. The capability information of the terminal device includes a codebook combination supported by the terminal device, and the codebook combination is used to determine a value of $M_v$. For example, the codebook combination includes one or more codebook types supported by the terminal device. A base station may select one codebook type in the codebook combination, and then deliver a value of $M_v$ corresponding to the codebook type.

The terminal device may receive second indication information. The second indication information indicates the value of $M_v$.

In the method, a radio access network device may indicate the value of $M_v$ to the terminal device, and the terminal device may select $M_v$ frequency domain components based on the value of $M_v$, so that the radio access network device may reconstruct the precoding matrix based on the $M_v$ frequency domain components selected by the terminal device, to transmit uplink data.

In a possible design, the capability information of the terminal device further includes a maximum value of $M_v$ supported by the terminal device, and the value of $M_v$ indicated by the second indication information is less than or equal to the maximum value of $M_v$.

The maximum value of $M_v$ supported by the terminal device, a maximum quantity of ports of each resource, a maximum quantity of resources, and a maximum total quantity of ports may form a quadruplet, and the quadruplet is sent to the radio access network device.

In a possible design, the codebook combination includes one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

According to a fourth aspect, a communication method is provided. In the method, a radio access network device receives capability information of a terminal device. The capability information of the terminal device includes a codebook combination supported by the terminal device, and the codebook combination is used to determine a value of $M_v$.

The radio access network device sends second indication information. The second indication information indicates the value of $M_v$.

In a possible design, the capability information of the terminal device further includes a maximum value of $M_v$ supported by the terminal device, and the value of $M_v$ indicated by the second indication information is less than or equal to the maximum value of $M_v$.

In a possible design, the codebook combination includes one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

According to a fifth aspect, a communication apparatus is provided. The communication apparatus may be the foregoing terminal device or the radio access network device, or a chip disposed in the terminal device or the radio access network device. The communication apparatus may implement the method according to any one of the aspects.

The communication apparatus includes a corresponding module, unit, or means for implementing the foregoing method. The module, unit, or means may be implemented by using hardware or software, or implemented by using hardware by executing corresponding software. The hardware or the software includes one or more modules or units corresponding to the foregoing functions.

According to a sixth aspect, a communication apparatus is provided, including a transceiver unit. Optionally, the communication apparatus may further include a processing unit. The communication apparatus may implement the method according to any one of the aspects.

According to a seventh aspect, a communication apparatus is provided, including a processor. The processor may be configured to perform the method according to any one of the foregoing aspects.

Optionally, the apparatus further includes a memory, the processor is coupled to the memory, and the processor may be configured to execute instructions in the memory, so that the apparatus performs the method according to any one of the foregoing aspects.

Optionally, the apparatus further includes an interface circuit, and the processor is coupled to the interface circuit.

The interface circuit may be a code/data read/write interface circuit. The interface circuit is configured to receive computer-executable instructions (the computer execution instructions are stored in the memory, and may be directly read from the memory, or may be read by using another component) and transmit the computer-executable instructions to the processor, so that the processor runs the computer-executable instructions to perform the method according to any one of the foregoing aspects.

In some possible designs, the communication apparatus is a chip or a chip system.

According to an eighth aspect, a communication apparatus is provided, including a processor and a memory. The processor is configured to read instructions stored in the memory; receive a signal using a receiver; and transmit a signal using a transmitter, to perform the method according to any one of the foregoing aspects.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of memory and a manner in which the memory and the processor are disposed are not limited in this embodiment of this application.

The communication apparatus may be a chip. The processor may be implemented by using hardware, or may be implemented by using software. When the processor is implemented by using the hardware, the processor may be a logic circuit, an integrated circuit, or the like; or when the processor is implemented by using the software, the processor may be a general-purpose processor, and is implemented by reading software code stored in the memory. The memory may be integrated into the processor, or may be located outside the processor and exist independently.

According to a ninth aspect, a processor is provided, including an input circuit, an output circuit, and a processing circuit. The processing circuit is configured to receive a signal by using the input circuit; and transmit a signal by using the output circuit, so that the processor performs the method according to any one of the foregoing aspects.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit. The circuit is used as the input circuit and the output circuit at different moments. Specific implementations of the processor and the various circuits are not limited in embodiments of this application.

According to a tenth aspect, a communication apparatus is provided, including a logic circuit and an input/output interface. The input/output interface is configured to communicate with a module outside the communication apparatus; and the logic circuit is configured to run a computer program to perform the method according to any one of the foregoing aspects. The communication apparatus may be the terminal device or the radio access network device according to any one of the foregoing aspects, or an apparatus including the terminal device or the radio access network device, or an apparatus, such as a chip, included in the terminal device or the radio access network device.

Alternatively, the input/output interface may be a code/data read/write interface circuit, and the input/output interface is configured to receive a computer program (the computer program is stored in a memory, and may be directly read from the memory, or may pass through another component) and transmit the computer program to the input/output interface, so that the input/output interface runs the computer program to perform the method according to any one of the foregoing aspects.

Optionally, the communication apparatus may be a chip.

According to an eleventh aspect, a computer program product is provided. The computer program product includes a computer program (which may also be referred as code or instructions). When the computer program is run, a computer is enabled to perform the method according to any one of the foregoing aspects.

According to a twelfth aspect, a computer-readable medium is provided. The computer-readable medium stores a computer program (which may also be referred as code or instructions). When the computer program is run on a computer, the computer is enabled to perform the method according to any one of the foregoing aspects.

According to a thirteenth aspect, a chip system is provided. The chip system includes a processor and an interface, and is configured to support a communication apparatus in implementing functions according to any one of the foregoing aspects. In a possible design, the chip system further includes a memory, and the memory is configured to store information and data that are necessary for the foregoing communication apparatus. The chip system may include a chip, or may include a chip and another discrete component.

According to a fourteenth aspect, a function entity is provided. The function entity is configured to implement the method according to any one of the foregoing aspects.

According to a fifteenth aspect, a communication system is provided, including the terminal device and the radio access network device according to any one of the foregoing aspects.

For technical effects brought by any one of the designs of the fifth aspect to the thirteenth aspect, refer to technical effects brought by the first aspect to the fourth aspect. Details are not described herein again.

DETAILED DESCRIPTION OF THE EMBODIMENTS

Figure 1:
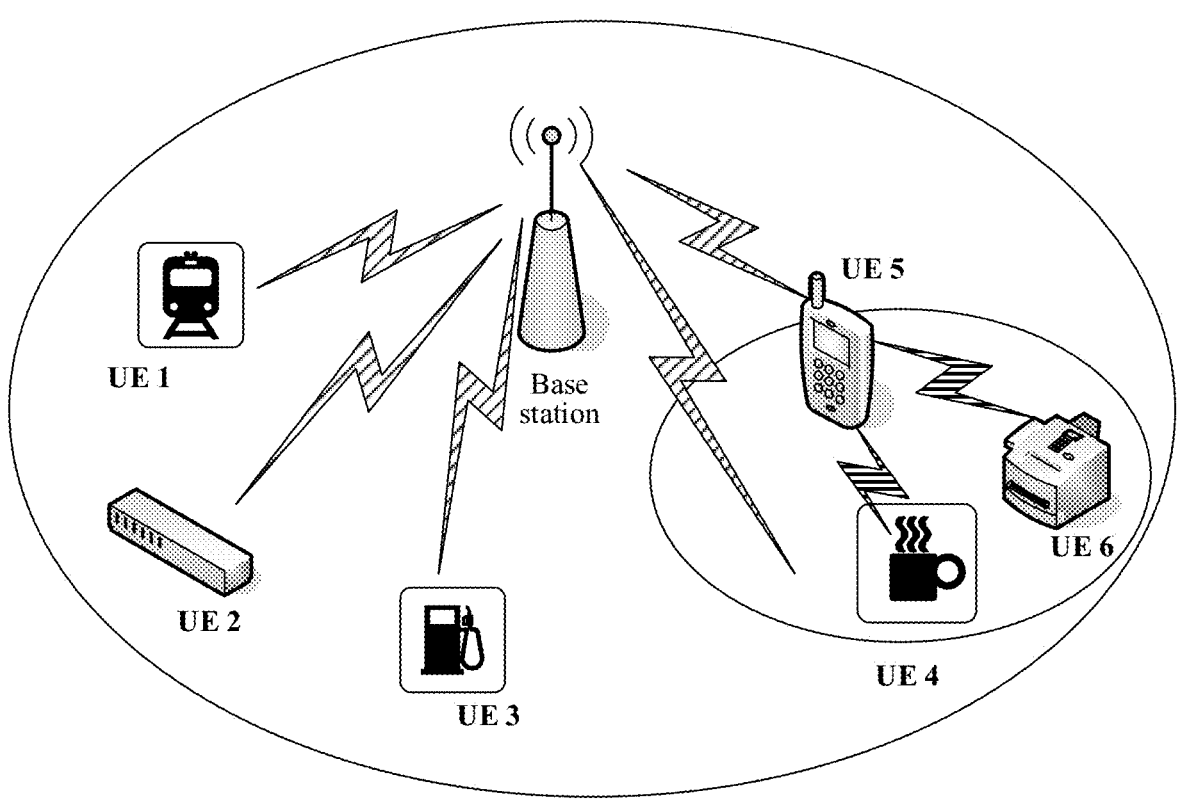
FIG. 1 is a schematic diagram of an architecture of a communication system.

The following further describes in detail this application with reference to accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in embodiments of this application is used to indicate giving an example, an illustration, or a description. Any embodiment or design described as an "example" in this application should not be explained as being more preferred or having more advantages than another embodiment or design. Exactly, the term "example" is used to present a concept in a specific manner.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: with the evolution of the network architecture and the emergence of new service scenarios, the technical solutions provided in embodiments of this application are also applicable to similar technical problems.

The following describes some terms in embodiments of this application, to facilitate understanding of a person skilled in the art.

(1) A terminal device is a device configured to implement a wireless communication function. A terminal may be a user equipment (UE), an access terminal, a terminal unit, a terminal station, a mobile station, a modeset, a remote station, a remote terminal, a mobile device, a wireless communication device, a terminal agent, a terminal apparatus, or the like in a 5th generation (5G) network or a future evolved public land mobile network (PLMN). The access terminal may be a cellular phone, a cordless phone, a session initiation protocol (SIP) phone, a wireless local loop (WLL) station, a personal digital assistant (PDA), a handheld device or a computing device having a wireless communication function, or another processing device, vehicle-mounted device, or wearable device connected to a wireless modem, a virtual reality (VR) terminal device, an augmented reality (AR) terminal device, a wireless terminal in industrial control, a wireless terminal in self-driving, a wireless terminal in remote medical, a wireless terminal in a smart grid, a wireless terminal in transportation safety, a wireless terminal in a smart city, a wireless terminal in a smart home, or the like. Alternatively, the terminal may be a terminal (for example, a vehicle-to-everything device) in a vehicle-to-everything (V2X), a terminal in device-to-device communication, a terminal in machine to machine (M2M) communication, or the like. The terminal may be mobile or fixed.

(2) A network device is a device that enables a terminal device to access a wireless network. The network device may be a node in a radio access network, and may also be referred to as a base station or a radio access network (RAN) device (or node). For example, the network device may include an evolved base station (NodeB, eNB, or eNodeB, evolved NodeB) in a long term evolution (LTE) system or an LTE-advanced (LTE-A) system, for example, a conventional macro base station eNB and a micro base station eNB in a heterogeneous network scenario. Alternatively, the network device may include a next generation NodeB (gNB) in a 5th generation (5G) new radio (NR) system, or may further include a transmission reception point (TRP), a home base station (for example, a home evolved NodeB, or a home NodeB, HNB), a baseband unit (BBU), a baseband pool BBU pool, or a wireless fidelity (Wi-Fi) access point (AP), or the like. Alternatively, the network device may further include a central unit (CU) and a distributed unit (DU) in a cloud access network (CloudRAN) system; or may include a network device in a non-terrestrial network (NTN), that is, may be deployed on a high-altitude platform or a satellite. In the NTN, the network device may act as a layer 1 (L1) relay, a base station, a DU, or an integrated access and backhaul (IAB) node. This is not limited in embodiments of this application.

Certainly, the network device may also be a node in a core network.

The term "and/or" in this application describes an association relationship for describing associated objects and indicates that three relationships may exist. For example, A and/or B may indicate the following three cases: Only A exists, both A and B exist, and only B exists. The character "/" generally indicates an "or" relationship between the associated objects.

In this application, "at least one" means one or more, and "a plurality of" means two or more.

In addition, it should be understood that in description of this application, terms such as "first" and "second" are merely used for purposes of distinguishing and description, but should not be understood as indicating or implying relative importance, or should not be understood as indicating or implying a sequence.

The technical solutions in embodiments of this application may be applied to various communication systems, for example, a satellite communication system or a conventional mobile communication system. The satellite communication system may be integrated with the conventional mobile communication system (that is, a terrestrial communication system). For example, the communication system is a wireless local area network (WLAN) communication system, a wireless fidelity (Wi-Fi) system, a long term evolution (LTE) system, an LTE frequency division duplex (FDD) system, an LTE time division duplex (TDD) system, a 5th generation (5G) system or a new radio (NR) system, a 6th generation (6G) system, another future communication system, or the like. The technical solutions further support a communication system integrating a plurality of wireless technologies, for example, a system that integrates the non-terrestrial network (NTN) and a terrestrial mobile communication network, such as an uncrewed aerial vehicle, a satellite communication system, a high altitude platform (HAPS) communication, and the like.

The communication system provided in embodiments of this application is applicable to communication between a radio access network device and a terminal device. The communication system may include one or more radio access network devices and one or more terminal devices. For example, as shown in FIG. 1, the communication system may include one or more network devices (for example, a base station in FIG. 1) and one or more terminal devices (for example, a UE 1 to a UE 6 in FIG. 1). The base station may send data to the UE 1 to the UE 6, and the UE 1 to the UE 6 may send uplink data to the base station. Optionally, the UE 4, the UE 5, and the UE 6 may constitute a communication system. In the communication system, the base station sends downlink data to the UE 1, the UE 2, the UE 5, and the like, and the UE 5 forwards the downlink data to the UE 4 and the UE 6. For example, the UE 5 may serve as a relay node to forward data between the UE and the base station.

A 5G mobile communication system imposes higher requirements on system capacities, spectral efficiency, transmission delay, and the like. As one of key technologies of 5G, an FDD massive multiple-input multiple-output (MIMO) antenna technology can effectively improve system capacities through spatial division multiplexing. A key factor for improving the system capacity is that a radio access network device obtains accurate downlink channel state information (CSI).

In an FDD system, there is a difference between uplink and downlink frequencies (for example, an uplink frequency is 2.1 GHZ, and a downlink frequency is 3.5 GHZ), and there is no channel reciprocity between an uplink channel and a downlink channel. Therefore, the downlink CSI needs to be fed back to the radio access network device by using the terminal device.

Figure 2:
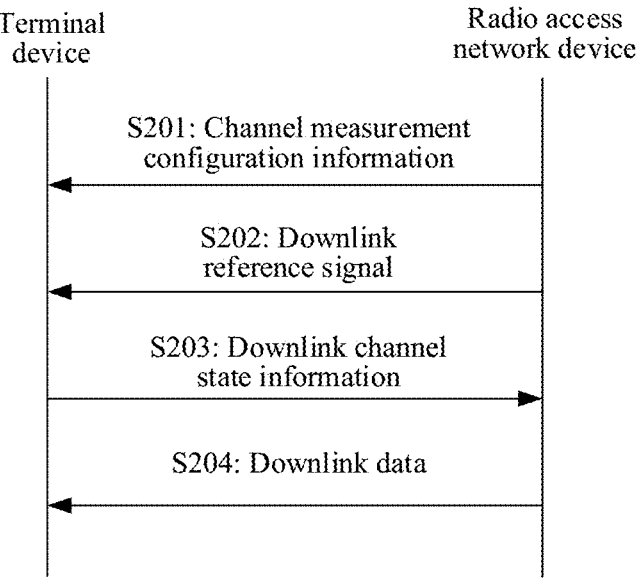
FIG. 2 is a schematic diagram of a channel state information indication process.

FIG. 2 is a schematic flowchart of downlink CSI feedback, including the following operations.

S201: A radio access network device sends channel measurement configuration information to a terminal device.

For example, the channel measurement configuration information includes a time-frequency resource used for channel measurement, and the like.

S202: The radio access network device sends, to the terminal device, a downlink reference signal used for the channel measurement.

For example, the downlink reference signal may be a downlink channel state information reference signal (CSI-RS), a demodulation reference signal (DMRS), or the like. This is not limited herein.

The terminal device receives the downlink reference signal based on the channel measurement configuration information.

S203: The terminal device estimates downlink CSI based on the received downlink reference signal; and feeds back the downlink CSI to the radio access network device.

The downlink CSI includes a rank indication (RI), a channel quality indication (CQI), a precoding matrix indication (PMI), and the like.

The RI indicates a quantity of valid data layers of a channel, and the radio access network device can learn of, based on the RI, a quantity of code words (CWs) that can be supported by the terminal device. For example, if RI=1, 1 CW is supported; if RI>1, 2 CWs are supported.

The CQI reflects channel quality of downlink channels. For example, 0 to 15 are used to indicate the channel quality, where 0 indicates worst channel quality, and 15 indicates optimal channel quality. After obtaining a CQI value, it implies that the radio access network device has known quality of a current downlink channel, and therefore select an appropriate channel for scheduling.

The PMI is used to determine a precoding matrix. For example, the PMI includes information about a coefficient matrix. In simple words, precoding is to multiply data by the precoding matrix.

S204: The radio access network device determines, based on the downlink CSI fed back by the terminal device, a precoding matrix corresponding to downlink data transmission; and sends downlink data based on the precoding matrix.

For example, the radio access network device determines a quantity of data flows of downlink transmission based on RI information fed back by the terminal device; determines a modulation order of downlink data based on CQI information fed back by the terminal device; and determines a precoding matrix of downlink data transmission based on the PMI fed back by the terminal device.

Although there is no channel reciprocity between an uplink channel and a downlink channel in an FDD system, some information of the FDD uplink and downlink channels has reciprocity. For example, angles and delays of the uplink and downlink channels have reciprocity. Therefore, a CSI feedback procedure may be designed based on the reciprocity of angles and delays in the FDD system.

Figure 3:
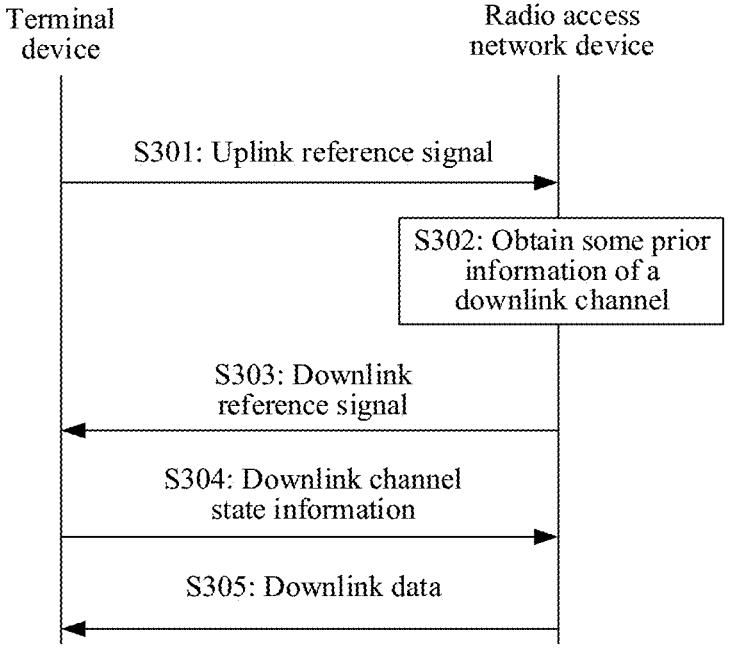
FIG. 3 is a schematic diagram of a channel state information indication process.

FIG. 3 is a schematic flowchart of CSI feedback based on some reciprocity of FDD, including the following operations.

S301: A terminal device sends an uplink reference signal to a radio access network device.

For example, the uplink reference signal may be a sounding reference signal (SRS).

S302: The radio access network device performs channel estimation on an uplink channel, to obtain some prior information of a downlink channel.

For example, some prior information of the downlink channel includes an angle and a delay of the downlink channel, and the like.

S303: The radio access network device sends a downlink reference signal based on the some prior information of the downlink channel.

The terminal device performs channel measurement based on the downlink reference signal.

For S304, refer to S203.

For example, downlink CSI fed back by the terminal device in S304 may be only non-reciprocity information of uplink and downlink channels. The radio access network device has obtained reciprocity information of the uplink and downlink channels in S302, for example, the some prior information of the downlink channel. Therefore, the terminal device does not need to feed back the reciprocity information in this operation. This reduces feedback overheads.

S305: The radio access network device determines a precoding matrix based on the some prior information of the downlink channel and the downlink CSI fed back by the terminal device in S304, and sends downlink data based on the precoding matrix.

In the technical specifications of 3GPP R16 and R17, the precoding matrix (which may also be referred to as a precoding codebook) may be indicated in the following form:

$$W = W_1 W_2 W_f^H$$

W matrix includes $P_{CSI-RS}$ rows and $N_3$ columns. $W_1 \in \mathbb{N}^{P_{CSI-RS} \times L}$, $W_1$ is a port selection matrix, and represents that L ports are selected from $P_{CSI-RS}$ ports. $P_{CSI-RS}$ indicates a quantity of ports for sending a reference signal CSI-RS. $W_2 \in \mathbb{C}^{L \times M_v}$. $W_f \in \mathbb{C}^{N_3 \times M_v}$, $W_f$ is a frequency domain base matrix (also referred to as a frequency domain compression matrix), and $W_f$ indicates M columns selected from a discrete fourier transform (DFT) matrix set, namely, M frequency domain components. $N_3$ is a quantity of frequency domain RB resources or a quantity of subbands in a bandwidth part (BWP) supported by the terminal device.

In related technologies, the radio access network device indicates a window length N to the terminal device, and a start location of the window length N is a start location of $N_3$ candidate frequency domain components. The terminal device selects $M_v$ frequency domain components from N consecutive candidate frequency domain components based on an indication of the radio access network device. The $M_v$ frequency domain components may be consecutive or inconsecutive, and a subscript v indicates an index of a layer (which may also be referred to as a flow). When $N > M_v$, the terminal device indicates selected frequency domain components to the radio access network device by using $$log_2 \binom{N}{M_v}$$

bits. For example, when $M_v = 2$ and $N = 4$, there are six possible selection manners in which the terminal device selects two frequency domain components from four DFT vectors, and the terminal device needs three bits of information for indication. However, in a plurality of frequency domain component selection manners, the radio access network device may determine precoding matrices having a same coding effect. Therefore, when the terminal device indicates each frequency domain component selection manner, there are unnecessary feedback overheads for indication information of the frequency domain component.

Based on this, an embodiment of this application provides a frequency domain component reporting method, and the method may be applied to the communication system in FIG. 1. In the method, the terminal device may select and indicate the $M_v$ frequency domain components from the N candidate frequency domain components. The indication information indicating the $M_v$ frequency domain components occupies $$\left\lceil log_2 \binom{N-1}{M_v-1} \right\rceil$$

bits, $M_v$ is a positive integer less than N, and [ . . . ] is an operation of rounding up to the nearest integer. In the frequency domain component reporting method provided in this embodiment of this application, considering that the $M_v$ different frequency domain components may enable the radio access network device to determine precoding matrices having a same coding effect, the $M_v$ frequency domain components may be indicated by using a same bit value. This reduces the feedback overheads of the frequency domain component.

Figure 4:
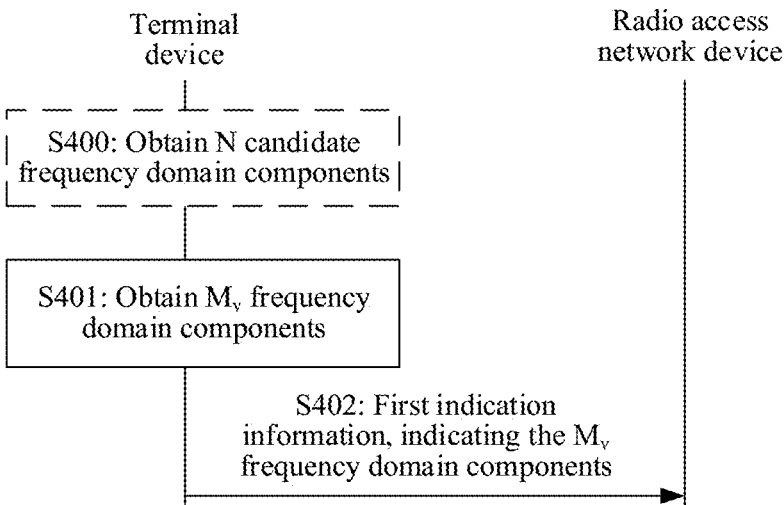
FIG. 4 is a schematic flowchart of reporting a frequency domain component according to an embodiment of this application.

FIG. 4 is a possible frequency domain component reporting process according to an embodiment of this application. The process includes the following operations.

S401: A terminal device obtains $M_v$ frequency domain components.

The $M_v$ frequency domain components are a subset of N candidate frequency domain components. $M_v$ is a positive integer less than or equal to N, a subscript v indicates an index of a layer (which may also be referred to as a flow), and corresponds to $v^{th}$ layer data or $v^{th}$ flow data in a case in which a radio access network device performs multiple-input multiple-output (MIMO) transmission to the terminal device. For a $v^{th}$ layer (flow), the terminal device may indicate $M_v$ corresponding frequency domain components. $M_v$ frequency domain components corresponding to different layers (flows) may be the same or may be different. When values of $M_v$ corresponding to different layers (flows) are the same, the terminal device may indicate the $M_v$ frequency domain components corresponding to all layers (flows) at a time, or may separately indicate the $M_v$ frequency domain components corresponding to the $v^{th}$ layer (flow). When values of $M_v$ corresponding to different layers (flows) are different, the terminal device may separately indicate the $M_v$ frequency domain components corresponding to the $v^{th}$ layer (flow). It should be noted that, before S401, information about the N candidate frequency domain components is known to the terminal device. How the terminal device learns of the N candidate frequency domain components is not limited in this specification. Generally, when the terminal device indicates the $M_v$ frequency domain components, indexes of the $M_v$ frequency domain components are indicated.

In S401, the terminal device may select the $M_v$ frequency domain components from the N candidate frequency domain components. For example, the terminal device may randomly select the $M_v$ frequency domain components from the N candidate frequency domain components. For another example, when $M_v=N$, the terminal device may directly use the N candidate frequency domain components as the $M_v$ frequency domain components, that is, the terminal device selects all the N candidate frequency domain components.

A value of $M_v$ may be protocol-specified, or may be configured by the radio access network device. For a manner of the configuration by the radio access network device, refer to the following content.

For example, $M_v$ is 1, and N is an integer greater than or equal to 1. For example, N is 1 or 2.

In another example, $M_v$ is 2, and N is an integer greater than or equal to 2. For example, N may be one of 2, 3, 4, or 5.

In another example, $M_v$ is an integer greater than 2, and N is an integer greater than or equal to $M_v$.

The terminal device may obtain a classification and combination result of the N candidate frequency domain components. For example, the classification and combination result is at least two types (for example, N−1 types) of frequency domain component sets. That the terminal device obtains the classification and combination result of the N candidate frequency domain components may be that the terminal device performs classification and combination on the N candidate frequency domain components, or the radio access network device delivers the classification and combination result to the terminal device, or may be protocol-specified. Each frequency domain component subset in each type of frequency domain component set is equivalent for reconstructing a precoding matrix by the radio access network device. In other words, the radio access network device may obtain, through reconstruction based on any frequency domain component subset, precoding matrices having a same coding effect. Each frequency domain component subset includes $M_v$ frequency domain components, quantities of frequency domain components separating frequency domain components in frequency domain component subsets in different types of frequency domain component sets are different, and quantities of frequency domain components separating frequency domain components at corresponding locations in frequency domain component subsets in a same type of frequency domain component set are the same. For example, two frequency domain components that are adjacent in any frequency domain component subset in the same type of frequency domain component set are consecutive, or are separated by one frequency domain component or two frequency domain components.

The following briefly describes the equivalence of the frequency domain component subset in each type of frequency domain component set for reconstructing a precoding matrix by the radio access network device. It is assumed that $W_1$ and $W_2$ are definite, $M_v$ is 2, N is 4, and candidate frequency domain components are $\tilde{W}_f=\{w_{f1}, w_{f2}, w_{f3}, w_{f4}\}$. $w_{f1}, w_{f2}, w_{f3}$, and $w_{f4}$ are four frequency domain components that are consecutive or separated by a same quantity of frequency domain components, and two frequency domain components that are adjacent in $w_{f1}, w_{f2}, w_{f3}$, and $w_{f4}$ have a fixed phase offset. If the $M_v$ selected frequency domain components are $W_f=\{w_{f1}, w_{f2}\}$, the precoding matrix is $$W = W_1 W_2 W_f^H.$$

If the $M_v$ selected frequency domain components are $W_f=\{w_{f2}, w_{f3}\}$, the precoding matrix is $$W = W_1 W_2 \overline{W}_f^H = W_1 W_2 W_f^H \odot \left[1, \dots, \exp\left(\frac{j2\pi(N_3-1)}{N_3}\right)\right].$$

$\odot$ indicates that each column of the $$W_1 W_2 W_f^H$$

matrix is multiplied by each element corresponding to the vector $$\left[1, \dots, \exp\left(\frac{j2\pi(N_3-1)}{N_3}\right)\right].$$

It can be learned that a corresponding element corresponding to the vector precoding matrix (which is referred to as a precoding matrix 1) in a case in which the frequency domain component $\{w_{f2}, w_{f3}\}$ is selected is multiplied by a complex number whose modulus is 1, which is equivalent to a corresponding precoding matrix (which is referred to as a precoding matrix 2) in a case in which the frequency domain component $\{w_{f1}, w_{f2}\}$ is selected. The radio access network device normalizes the determined precoding matrix. A normalized precoding matrix 1 and a normalized precoding matrix 2 are the same. Therefore, it is considered that $\{w_{f2}, w_{f3}\}$ and $\{w_{f1}, w_{f2}\}$ are equivalent for reconstructing a precoding matrix by the radio access network device, or coding effects are the same.

The following uses an example in which $M_v$ is 2, and N is an integer greater than 2 for description. In the following example, the N candidate frequency domain components are consecutive candidate frequency domain components, and a start value of the frequency domain components is 0. It should be noted that the start value of the candidate frequency domain components may alternatively be another value, and that the N candidate frequency domain component sets are combined and classified when the start value is another value is similar to the following example. For example, when the start value is 1, the N candidate frequency domain components may include $\{1, 2, \dots, N\}$. When N is a larger value (for example, greater than 5), that the N candidate frequency domain component sets are combined and classified is similar to the following example. Details are not described herein again.

Example 1: $M_v$ is 2, N is 3, and the candidate frequency domain components include $\{0, 1, 2\}$.

Three consecutive candidate frequency domain components are classified and combined to obtain two types of frequency domain component sets. A first type of frequency domain component set is {(0, 1), (1, 2)}, and a second type of frequency domain component set is {(0, 2)}. Two frequency domain components in the first type of frequency domain component set are adjacent, and two frequency domain components in the second type of frequency domain component set are separated by one frequency domain component. The frequency domain component subsets in the first type of frequency domain component set are (0, 1) and (1, 2), and the frequency domain component subset in the second type of frequency domain component set is (0, 2).

Example 2: $M_v$ is 2, N is 4, and the candidate frequency domain components include {0, 1, 2, 3}.

Four consecutive candidate frequency domain components are classified and combined to obtain three types of frequency domain component sets. A first type of frequency domain component set is {(0, 1), (1, 2), (2, 3)}, a second type of frequency domain component set is {(0, 2), (1, 3)}, and a third type of frequency domain component set is {(0, 3)}. Two frequency domain components in the first type of frequency domain component set are adjacent, two frequency domain components in the second type of frequency domain component set are separated by one frequency domain component, and two frequency domain components in the third type of frequency domain component set are separated by two frequency domain components.

Example 3: $M_v$ is 2, N is 5, and the candidate frequency domain components include {0, 1, 2, 3, 4}.

Five consecutive candidate frequency domain components are classified and combined to obtain four types of frequency domain component sets. A first type of frequency domain component set is {(0, 1), (1, 2), (2, 3), (3, 4)}, a second type of frequency domain component set is {(0, 2), (1, 3), (2, 4)}, a third type of frequency domain component set is {(0, 3), (1, 4)}, and a fourth type of frequency domain component set is {(0, 4)}. Two frequency domain components in the first type of frequency domain component set are adjacent, two frequency domain components in the second type of frequency domain component set are separated by one frequency domain component, two frequency domain components in the third type of frequency domain component set are separated by two frequency domain components, and two frequency domain components in the fourth type of frequency domain component set are separated by three frequency domain components.

Optionally, before operation S401, operation S400 is further included: The terminal device obtains the N candidate frequency domain components.

N is a positive integer, and N is generally less than or equal to $N_3$. The frequency domain component is a column vector that is in a DFT matrix and that is generated based on a quantity of subbands $N_3$.

The N candidate frequency domain components may be N consecutive candidate frequency domain components, and any two frequency domain components that are adjacent in the N consecutive candidate frequency domain components have a fixed phase offset. This case is mainly used for description in this embodiment of this application. Alternatively, the N candidate frequency domain components may be N inconsecutive candidate frequency domain components.

The N candidate frequency domain components may be protocol-specified, or may be configured by the radio access network device. The N candidate frequency domain components may be determined by using a quantity N of candidate frequency domain components and a location of the candidate frequency domain components.

If the N candidate frequency domain components are configured by the radio access network device, in S400, the radio access network device may send the quantity N of candidate frequency domain components and a location (for example, a start location or an end location) of an optional candidate frequency domain component to the terminal device. If the radio access network device does not indicate the location of the candidate frequency domain components, the terminal device may consider by default that the location of the candidate frequency domain components is a start location of the $N_3$ frequency domain components.

If the N candidate frequency domain components are protocol-specified, the terminal device may store the quantity N of candidate frequency domain components and the location of the optional candidate frequency domain component. Certainly, the radio access network device also stores the N candidate frequency domain components, or stores the quantity N of candidate frequency domain components and the location of the optional candidate frequency domain component.

S402: The terminal device sends first indication information. Correspondingly, the radio access network device receives the first indication information. The first indication information indicates the $M_v$ frequency domain components, and the first indication information occupies $$\left\lceil \log_2 \binom{N-1}{M_v-1} \right\rceil$$

bits.

The first indication information is included in precoding matrix indication PMI information, and the PMI information may be carried in uplink control information (UCI). The UCI may be used by the terminal device to feed back downlink CSI.

In this embodiment, one (or more) frequency domain component may be reported by default, and the terminal device may select $(M_v-1)$ frequency domain components from $(N-1)$ candidate frequency domain components for reporting. Because the one (or more) frequency domain component reported by default does not need to be indicated by an additional bit, feedback overheads of the frequency domain component can be reduced. In this case, the N candidate frequency domain components may be classified and combined, or may not be classified and combined.

Alternatively, in this embodiment, the N candidate frequency domain components may be classified and combined. Each type of frequency domain component set includes one or more frequency domain component subsets, and each frequency domain component subset includes the $M_v$ frequency domain components. The terminal device selects one type of frequency domain component set from the at least two types of frequency domain component sets (the type of frequency domain component set includes a frequency domain component subset in which the $M_v$ frequency domain components selected by the terminal device are located) for reporting, and occupies few bit overheads when the frequency domain component set is indicated, so that feedback overheads of the frequency domain component can be reduced. In this case, one (or more) frequency domain component may be reported by default, and the terminal device may report a frequency domain component set in which $(M_v-1)$ selected frequency domain components are located.

If the N consecutive candidate frequency domain components are classified and combined, frequency domain component subsets in the same type of frequency domain component set are equivalent for reconstructing a precoding matrix by the radio access network device. Therefore, indicating any frequency domain component subset in the same type of frequency domain component set by the terminal device does not affect a result of reconstructing the precoding matrix by the radio access network device.

The following describes different manners of indicating the frequency domain component by using several examples. An indication manner used when the terminal device reports the frequency domain component may be protocol-specified, or may be configured by the radio access network device. For example, the terminal device may obtain, before S401, the indication manner used for reporting the frequency domain component. If the indication manner is configured by the radio access network device, optionally, before S401, the radio access network device sends third indication information to the terminal device. The third indication information indicates the indication manner used when the terminal device reports the frequency domain component. In S400, the radio access network device may include the third indication information and the N candidate frequency domain components in a same message and indicate the third indication information and the N candidate frequency domain components to the terminal device, or may include the third indication information and the N candidate frequency domain components in different messages and indicate the third indication information and the N candidate frequency domain components to the terminal device.

Example 1: $M_v$ is 2, N is 3, the candidate frequency domain components include {0, 1, 2}, and two types of frequency domain component sets obtained through classification and combination are respectively a first type of frequency domain component set {(0, 1), (1, 2)} and a second type of frequency domain component set {(0,2)}. If equivalence of reconstructing a precoding matrix is not considered, there are six possibilities for selecting two frequency domain components from the three consecutive candidate frequency domain components, and at least three bits are needed for indication. However, if the equivalence of reconstructing a precoding matrix is considered, the first indication information indicates the frequency domain components using one bit. Therefore, bit overheads of the frequency domain component indication can be reduced.

Manner 1.1: A frequency domain component at the start location or the end location in the N candidate frequency domain components may be selected by default. In other words, the frequency domain component at the start location or the end location does not need to be reported, and the terminal device may report only one frequency domain component. In this case, the terminal device may perform selection from the N−1 frequency domain components. Whether the frequency domain component at the start location or the end location is selected by the terminal device by default for not reporting may be configured by the radio access network device, or may be protocol-specified. If the radio access network device performs the configuration, when indicating the third indication information (in this case, the third indication information indicates the reporting manner used in Manner 1.1), the radio access network device may also indicate the terminal device to select the frequency domain component at the start location or the end location by default for not reporting.

For example, the frequency domain component at the start location is selected by default. A possible indication manner is shown in Table 1. The terminal device indicates two selected frequency domain components using one bit. When a bit value is 0, it indicates that the terminal device reports a frequency domain component 1. Because the radio access network device considers by default that the terminal device selects the frequency domain component at the start location and does not need to report the frequency domain component, when the bit value is 0, the radio access network device may determine that the terminal device actually wants to report a frequency domain component (0, 1). When the bit value is 1, it indicates that the terminal device reports a frequency domain component 2. Because the radio access network device considers by default that the terminal device selects the frequency domain component at the start location, when the bit value is 1, the radio access network device may determine that the terminal device actually wants to report a frequency domain component (0, 2).

It should be noted that the terminal device and the radio access network device store a same correspondence (for example, a correspondence shown in each of the following tables) between the bit value and the frequency domain component. Therefore, the radio access network device may determine, based on a bit value of the first indication information reported by the terminal device, the frequency domain component that the terminal device actually wants to report. A correspondence between the bit value and the frequency domain component may be protocol-specified, or may be configured by the radio access network device. If the radio access network device performs the configuration, the radio access network device needs to configure the correspondence between the bit value and the frequency domain component for the terminal device before S402. An occasion of the configuration by the radio access network device is not limited in this embodiment of this application.

TABLE 1

| Bit value of first indication information | Reported frequency domain component | Remarks |
|---|---|---|
| 0 | 1 | The radio access network device considers by default that the frequency domain component at the start location is selected. |
| 1 | 2 | The radio access network device considers by default that the frequency domain component at the start location is selected. |

For another example, the frequency domain component at the end location is selected by default. A possible indication manner is shown in Table 2. The terminal device indicates two selected frequency domain components using one bit. When the bit value is 0, it indicates that the terminal device reports a frequency domain component 0. Because the radio access network device considers by default that the terminal device selects the frequency domain component at the end location, when the bit value is 0, the radio access network device may determine that the terminal device actually wants to report a frequency domain component (0, 2). When the bit value is 1, it indicates that the terminal device reports the frequency domain component 1. Because the radio access network device considers by default that the terminal device selects the frequency domain component at the end location, when the bit value is 1, the radio access network device may determine that the terminal device actually wants to report a frequency domain component (1, 2).

TABLE 2

| Bit value of first indication information | Reported frequency domain component | Remarks |
|---|---|---|
| 0 | 0 | The radio access network device considers by default that the frequency domain component at the end location is selected. |
| 1 | 1 | The radio access network device considers by default that the frequency domain component at the end location is selected. |

Manner 1.2: A frequency domain component with a specific value in the N candidate frequency domain components may be selected by default. In other words, the frequency domain component with the specific value does not need to be reported, and the terminal device may report only one frequency domain component. In this case, the terminal device may perform selection from the N−1 frequency domain components. The terminal device selects the frequency domain component with the specific value by default for not reporting, and this may be configured by the radio access network device, or may be protocol-specified. If the radio access network device performs the configuration, when indicating the third indication information (in this case, the third indication information indicates the reporting manner used in Manner 1.2), the radio access network device may also indicate the terminal device to select the frequency domain component with the specific value (for example, the frequency domain component 0 or 2) by default for not reporting.

For example, the frequency domain component 0 is selected by default. A possible indication manner is shown in Table 3. The terminal device indicates two selected frequency domain components using one bit, and the terminal device reports the frequency domain component 0 by default. When the bit value is 0, it indicates that the frequency domain component reported by the terminal device is (0, 1). The radio access network device may determine that the terminal device wants to report the frequency domain component (0, 1). When the bit value is 1, it indicates that the terminal device wants to report the frequency domain component (0, 2). The radio access network device may determine that the terminal device wants to report the frequency domain component (0, 2).

TABLE 3

| Bit value of first indication information | Reported frequency domain component | Remarks |
|---|---|---|
| 0 | (0, 1) | The terminal device reports the frequency domain component 0 by default. |
| 1 | (0, 2) | The terminal device reports the frequency domain component 0 by default. |

For another example, the frequency domain component 2 is selected by default. A possible indication manner is shown in Table 4. The terminal device indicates two selected frequency domain components using one bit, and the terminal device reports the frequency domain component 2 by default. When the bit value is 0, it indicates that the frequency domain component reported by the terminal device is (0, 2). The radio access network device may determine that the terminal device wants to report the frequency domain component (0, 2). When the bit value is 1, it indicates that the terminal device wants to report the frequency domain component (1, 2). The radio access network device may determine that the terminal device wants to report the frequency domain component (1, 2).

TABLE 4

| Bit value of first indication information | Reported frequency domain component | Remarks |
|---|---|---|
| 0 | (0, 2) | The terminal device reports the frequency domain component 2 by default. |
| 1 | (1, 2) | The terminal device reports the frequency domain component 2 by default. |

Manner 1.3: The terminal device may select any frequency domain component from each type of frequency domain component set (that is, equivalent frequency domain components) for indication. In this case, the terminal device may perform selection from the N frequency domain components.

A possible indication manner is shown in Table 5. The terminal device indicates two selected frequency domain components using one bit. When a bit value is 0, it indicates that the terminal device reports a first type of frequency domain component set, that is, two frequency domain components that are adjacent. The radio access network device may determine that the terminal device wants to report the frequency domain component (0, 1) or (0, 2). Because (0, 1) and (0, 2) belong to a same type of frequency domain component set, and are equivalent for reconstructing a precoding matrix, the radio access network device may randomly select either (0, 1) or (0, 2) to reconstruct the precoding matrix. When the bit value is 1, it indicates that the terminal device reports a second type of frequency domain component set, that is, two frequency domain components separated by one frequency domain component. The radio access network device may determine that the terminal device wants to report the frequency domain component (1, 2).

TABLE 5

| Bit value of first indication information | Reported frequency domain component | Remarks |
|---|---|---|
| 0 | (0, 1) and (0, 2) | Two frequency domain components that are adjacent |
| 1 | (1, 2) | Two frequency domain components separated by one frequency domain component |

Example 2: $M_v$ is 2, N is 4, the candidate frequency domain components include {0, 1, 2, 3}, and three types of frequency domain component sets obtained through classification and combination are respectively a first type of frequency domain component set {(0, 1), (1, 2), (2, 3)}, a second type of frequency domain component set {(0, 2), (1, 3)}, and a third type of frequency domain component set {(0, 3)}. If equivalence of reconstructing a precoding matrix is not considered, there are eight possibilities for selecting two frequency domain components from the four consecutive candidate frequency domain components, and at least three bits are needed for indication. However, if the equivalence of reconstructing a precoding matrix is considered, the first indication information indicates the frequency domain components using two bits. Therefore, bit overheads of the frequency domain component indication can be reduced.

Manner 2.1: The frequency domain component at the start location or the end location in the N candidate frequency domain components may be selected by default.

For example, the frequency domain component at the start location is selected by default. A possible indication manner is shown in Table 6. The terminal device indicates two selected frequency domain components using two bits. When a value of the two bits is 00, it indicates that the terminal device reports a frequency domain component 1. Because the radio access network device considers by default that the terminal device selects the frequency domain component at the start location, when the value of the two bits is 00, the radio access network device may determine that the terminal device actually wants to report the frequency domain component (0, 1). When the value of the two bits is 01, it indicates that the terminal device reports a frequency domain component 2. Because the radio access network device considers by default that the terminal device selects the frequency domain component at the start location, when the value of the two bits is 01, the radio access network device may determine that the terminal device actually wants to report the frequency domain component (0, 2). When the value of the two bits is 10, it indicates that the terminal device reports a frequency domain component 3. Because the radio access network device considers by default that the terminal device selects the frequency domain component at the start location, when the value of the two bits is 10, the radio access network device may determine that the terminal device actually wants to report the frequency domain component (0, 3).

TABLE 6

| Bit value of first indication information | Reported frequency domain component | Remarks |
|---|---|---|
| 00 | 1 | The radio access network device considers by default that the frequency domain component at the start location is selected. |
| 01 | 2 | The radio access network device considers by default that the frequency domain component at the start location is selected. |
| 10 | 3 | The radio access network device considers by default that the frequency domain component at the start location is selected. |

For another example, the frequency domain component at the end location is selected by default. A possible indication manner is shown in Table 7. The terminal device indicates two selected frequency domain components using two bits. When a value of the two bits is 00, it indicates that the terminal device reports the frequency domain component 0. Because the radio access network device considers by default that the terminal device selects the frequency domain component at the end location, when the value of the two bits is 00, the radio access network device may determine that the terminal device actually wants to report a frequency domain component (0, 3). When the value of the two bits is 01, it indicates that the terminal device reports the frequency domain component 1. Because the radio access network device considers by default that the terminal device selects the frequency domain component at the end location, when the value of the two bits is 01, the radio access network device may determine that the terminal device actually wants to report a frequency domain component (1, 3). When the value of the two bits is 10, it indicates that the terminal device reports the frequency domain component 2. Because the radio access network device considers by default that the terminal device selects the frequency domain component at the end location, when the value of the two bits is 10, the radio access network device may determine that the terminal device actually wants to report a frequency domain component (2, 3).

TABLE 7

| Bit value of first indication information | Reported frequency domain component | Remarks |
|---|---|---|
| 00 | 0 | The radio access network device considers by default that the frequency domain component at the end location is selected. |
| 01 | 1 | The radio access network device considers by default that the frequency domain component at the end location is selected. |
| 10 | 2 | The radio access network device considers by default that the frequency domain component at the end location is selected. |

Manner 2.2: A frequency domain component with a specific value in the N candidate frequency domain components may be selected by default.

For example, the frequency domain component 0 is selected by default. A possible indication manner is shown in Table 8. The terminal device indicates two selected frequency domain components using two bits, and the terminal device reports the frequency domain component 0 by default. When a value of the two bits is 00, it indicates that the frequency domain component reported by the terminal device is (0, 1). The radio access network device may determine that the terminal device wants to report the frequency domain component (0, 1). When the value of the two bits is 01, it indicates that the frequency domain component reported by the terminal device is (0, 2). The radio access network device may determine that the terminal device wants to report the frequency domain component (0, 2). When the value of the two bits is 10, it indicates that the frequency domain component reported by the terminal device is (0, 3). The radio access network device may determine that the terminal device wants to report the frequency domain component (0, 3).

TABLE 8

| Bit value of first indication information | Reported frequency domain component | Remarks |
|---|---|---|
| 00 | (0, 1) | The terminal device reports the frequency domain component 0 by default. |

TABLE 8-continued

| Bit value of first indication information | Reported frequency domain component | Remarks |
|---|---|---|
| 01 | (0, 2) | The terminal device reports the frequency domain component 0 by default. |
| 10 | (0, 3) | The terminal device reports the frequency domain component 0 by default. |

For another example, the frequency domain component 3 is selected by default. A possible indication manner is shown in Table 9. The terminal device indicates two selected frequency domain components using two bits, and the terminal device reports the frequency domain component 3 by default. When a value of the two bits is 00, it indicates that the frequency domain component reported by the terminal device is (0, 3). The radio access network device may determine that the terminal device wants to report the frequency domain component (0, 3). When the value of the two bits is 01, it indicates that the frequency domain component reported by the terminal device is (1, 3). The radio access network device may determine that the terminal device wants to report the frequency domain component (1, 3). When the value of the two bits is 10, it indicates that the frequency domain component reported by the terminal device is (2, 3). The radio access network device may determine that the terminal device wants to report the frequency domain component (2, 3).

TABLE 9

| Bit value of first indication information | Reported frequency domain component | Remarks |
|---|---|---|
| 00 | (0, 3) | The terminal device reports the frequency domain component 3 by default. |
| 01 | (1, 3) | The terminal device reports the frequency domain component 3 by default. |
| 10 | (2, 3) | The terminal device reports the frequency domain component 3 by default. |

Manner 2.3: The terminal device may select any frequency domain component from each type of frequency domain component set for indication.

A possible indication manner is shown in Table 10. The terminal device indicates two selected frequency domain components using two bits. When a value of the two bits is 00, it indicates that the terminal device reports a first type of frequency domain component set, that is, two frequency domain components that are adjacent. The radio access network device may determine that the terminal device wants to report a frequency domain component (0, 1), (1, 2), or (2, 3). Because (0, 1), (1, 2), and (2, 3) belong to a same type of frequency domain component set, and are equivalent for reconstructing a precoding matrix, the radio access network device may randomly select (0, 1), (1, 2) or (2, 3) to reconstruct the precoding matrix. When the value of the two bits is 01, it indicates that the terminal device reports a second type of frequency domain component set, that is, two frequency domain components separated by one frequency domain component. The radio access network device may determine that the terminal device wants to report the frequency domain component (0, 2) or (1, 3). Because (0, 2)

and (1, 3) belong to the same type of frequency domain component set, and are equivalent for reconstructing the precoding matrix, the radio access network device may randomly select either (0, 2) or (1, 3) to reconstruct the precoding matrix. When the value of the two bits is 10, it indicates that the terminal device reports a third type of frequency domain component set, that is, two frequency domain components separated by two frequency domain components.

TABLE 10

| Bit value of first indication information | Reported frequency domain component | Remarks |
|---|---|---|
| 00 | (0, 1), (1, 2), and (2, 3) | Two frequency domain components that are adjacent |
| 01 | (0, 2) and (1, 3) | Two frequency domain components separated by one frequency domain component |
| 10 | (0, 3) | Two frequency domain components separated by two frequency domain components |

Example 3: $M_v$ is 2, N is 5, the candidate frequency domain components include {0, 1, 2, 3, 4}, and four types of frequency domain component sets obtained through classification and combination are respectively a first type of frequency domain component set {(0, 1), (1, 2), (2, 3), (3, 4)}, a second type of frequency domain component set {(0, 2), (1, 3), (2, 4)}, a third type of frequency domain component set {(0, 3), (1, 4)}, and a fourth type of frequency domain component set {(0, 4)}. If equivalence of reconstructing the precoding matrix is not considered, there are 10 possibilities for selecting two frequency domain components from the five consecutive candidate frequency domain components, and at least four bits are needed for indication. However, if the equivalence of reconstructing the precoding matrix is considered, the first indication information indicates the frequency domain components using two bits. Therefore, bit overheads of the frequency domain component indication can be reduced.

Manner 3.1: The frequency domain component at the start location or the end location in the N candidate frequency domain components may be selected by default.

For example, the frequency domain component at the start location is selected by default. A possible indication manner is shown in Table 11. The terminal device indicates two selected frequency domain components using two bits. When a value of the two bits is 00, it indicates that the terminal device reports a frequency domain component 1. Because the radio access network device considers by default that the terminal device selects the frequency domain component at the start location, when the value of the two bits is 00, the radio access network device may determine that the terminal device actually wants to report a frequency domain component (0, 1). When the value of the two bits is 01, it indicates that the terminal device reports a frequency domain component 2. Because the radio access network device considers by default that the terminal device selects the frequency domain component at the start location, when the value of the two bits is 01, the radio access network device may determine that the terminal device actually wants to report a frequency domain component (0, 2). When the value of the two bits is 10, it indicates that the terminal device reports a frequency domain component 3. Because the radio access network device considers by default that the terminal device selects the frequency domain component at the start location, when the value of the two bits is 10, the radio access network device may determine that the terminal device actually wants to report a frequency domain component (0, 3). When the value of the two bits is 11, it indicates that the terminal device reports a frequency domain component 4. Because the radio access network device considers by default that the terminal device selects the frequency domain component at the start location, when the value of the two bits is 11, the radio access network device may determine that the terminal device actually wants to report a frequency domain component (0, 4).

TABLE 11

| Bit value of first indication information | Reported frequency domain component | Remarks |
|---|---|---|
| 00 | 1 | The radio access network device considers by default that the frequency domain component at the start location is selected. |
| 01 | 2 | The radio access network device considers by default that the frequency domain component at the start location is selected. |
| 10 | 3 | The radio access network device considers by default that the frequency domain component at the start location is selected. |
| 11 | 4 | The radio access network device considers by default that the frequency domain component at the start location is selected. |

For another example, the frequency domain component at the end location is selected by default. A possible indication manner is shown in Table 12. The terminal device indicates two selected frequency domain components using two bits. When a value of the two bits is 00, it indicates that the terminal device reports a frequency domain component 0. Because the radio access network device considers by default that the terminal device selects the frequency domain component at the end location, when the value of the two bits is 00, the radio access network device may determine that the terminal device actually wants to report a frequency domain component (0, 4). When the value of the two bits is 01, it indicates that the terminal device reports the frequency domain component 1. Because the radio access network device considers by default that the terminal device selects the frequency domain component at the end location, when the value of the two bits is 01, the radio access network device may determine that the terminal device actually wants to report a frequency domain component (1, 4). When the value of the two bits is 10, it indicates that the terminal device reports the frequency domain component 2. Because the radio access network device considers by default that the terminal device selects the frequency domain component at the end location, when the value of the two bits is 10, the radio access network device may determine that the terminal device actually wants to report a frequency domain component (2, 4). When the value of the two bits is 11, it indicates that the terminal device reports the frequency domain component 3. Because the radio access network device considers by default that the terminal device selects the frequency domain component at the end location, when the value of the two bits is 11, the radio access network device may determine that the terminal device actually wants to report a frequency domain component (3, 4).

TABLE 12

| Bit value of first indication information | Reported frequency domain component | Remarks |
|---|---|---|
| 00 | 0 | The radio access network device considers by default that the frequency domain component at the end location is selected. |
| 01 | 1 | The radio access network device considers by default that the frequency domain component at the end location is selected. |
| 10 | 2 | The radio access network device considers by default that the frequency domain component at the end location is selected. |
| 11 | 3 | The radio access network device considers by default that the frequency domain component at the end location is selected. |

Manner 2.2: A frequency domain component with a specific value in the N candidate frequency domain components may be selected by default.

For example, the frequency domain component 0 is selected by default. A possible indication manner is shown in Table 13. The terminal device indicates two selected frequency domain components using two bits, and the terminal device reports the frequency domain component 0 by default. When a value of the two bits is 00, it indicates that the frequency domain component reported by the terminal device is (0, 1). The radio access network device may determine that the terminal device wants to report the frequency domain component (0, 1). When the value of the two bits is 01, it indicates that the frequency domain component reported by the terminal device is (0, 2). The radio access network device may determine that the terminal device wants to report the frequency domain component (0, 2). When the value of the two bits is 10, it indicates that the frequency domain component reported by the terminal device is (0, 3). The radio access network device may determine that the terminal device wants to report the frequency domain component (0, 3). When the value of the two bits is 11, it indicates that the frequency domain component reported by the terminal device is (0, 4). The radio access network device may determine that the terminal device wants to report the frequency domain component (0, 4).

TABLE 13

| Bit value of first indication information | Reported frequency domain component | Remarks |
|---|---|---|
| 00 | (0, 1) | The terminal device reports the frequency domain component 0 by default. |
| 01 | (0, 2) | The terminal device reports the frequency domain component 0 by default. |
| 10 | (0, 3) | The terminal device reports the frequency domain component 0 by default. |
| 11 | (0, 4) | The terminal device reports the frequency domain component 0 by default. |

For another example, the frequency domain component 4 is selected by default. A possible indication manner is shown in Table 14. The terminal device indicates two selected frequency domain components using two bits, and the terminal device reports the frequency domain component 4 by default. When a value of the two bits is 00, it indicates that the frequency domain component reported by the terminal device is (0, 4). The radio access network device may determine that the terminal device wants to report is the frequency domain component (0, 4). When the value of the two bits is 01, it indicates that the frequency domain component reported by the terminal device is (1, 4). The radio access network device may determine that the terminal device wants to report the frequency domain component (1, 4). When the value of the two bits is 10, it indicates that the frequency domain component reported by the terminal device is (2, 4). The radio access network device may determine that the terminal device wants to report the frequency domain component (2, 4). When the value of the two bits is 11, it indicates that the frequency domain component reported by the terminal device is (3, 4). The radio access network device may determine that the terminal device wants to report the frequency domain component (3, 4).

TABLE 14

| Bit value of first indication information | Reported frequency domain component | Remarks |
|---|---|---|
| 00 | (0, 4) | The terminal device reports the frequency domain component 4 by default. |
| 01 | (1, 4) | The terminal device reports the frequency domain component 4 by default. |
| 10 | (2, 4) | The terminal device reports the frequency domain component 4 by default. |
| 11 | (3, 4) | The terminal device reports the frequency domain component 4 by default. |

Manner 2.3: The terminal device may select any frequency domain component from each type of frequency domain component set for indication.

A possible indication manner is shown in Table 15. The terminal device indicates two selected frequency domain components using two bits. When a value of the two bits is 00, it indicates that the terminal device reports a first type of frequency domain component set, that is, two frequency domain components that are adjacent. The radio access network device may determine that the terminal device wants to report is the frequency domain component (0, 1), (1, 2), (2, 3), or (3, 4). Because (0, 1), (1, 2), (2, 3), and (3, 4) belong to a same type of frequency domain component set, and are equivalent for reconstructing the precoding matrix, the radio access network device may randomly select (0, 1), (1, 2) (2, 3) or (3, 4) to reconstruct the precoding matrix. When the value of the two bits is 01, it indicates that the terminal device reports a second type of frequency domain component set, that is, two frequency domain components separated by one frequency domain component. The radio access network device may determine that the terminal device wants to report the frequency domain component (0, 2), (1, 3), or (2, 4). Because (0, 2), (1, 3), and (2, 4) belong to a same type of frequency domain component set, and are equivalent for reconstructing the precoding matrix, the radio access network device may randomly select (0, 2), (1, 3), or (2, 4) to reconstruct the precoding matrix. When the value of the two bits is 10, it indicates that the terminal device reports a third type of frequency domain component set, that is, two frequency domain components separated by two frequency domain components. The radio access network device may determine that the terminal device wants to report the frequency domain component (0, 3) or (1, 4). Because (0, 3) and (1, 4) belong to the same type of frequency domain component set, and are equivalent for reconstructing the precoding matrix, the radio access network device may randomly select either (0, 3) or (1, 4) to reconstruct the precoding matrix. When the value of the two bits is 11, it indicates that the terminal device reports a fourth type of frequency domain component set, that is, two frequency domain components separated by three frequency domain components. The radio access network device may determine that the terminal device wants to report the frequency domain component (0, 4).

TABLE 15

| Bit coding indication | Reported frequency domain component | Remarks |
|---|---|---|
| 00 | (0, 1), (1, 2), (2, 3), and (3, 4) | Two frequency domain components that are adjacent |
| 01 | (0, 2), (1, 3), and (2, 4) | Two frequency domain components separated by one frequency domain component |
| 10 | (0, 3) and (1, 4) | Two frequency domain components separated by two frequency domain components |
| 11 | (0, 4) | Two frequency domain components separated by three frequency domain components |

It may be understood that the foregoing tables are merely examples, and do not constitute a limitation on a representation form. There may be more or fewer correspondences between the bit value and the reported frequency domain component in the tables. For example, the tables may be split or combined, or the like. Alternatively, the frequency domain component indicated by the bit value in the tables may be replaced with another frequency domain component (which may be another frequency domain component in the tables or may be a frequency domain component not in the tables). Alternatively, a sequence of the correspondences between the bit value and the reported frequency domain component in the tables may not be limited to the foregoing tables. This is not limited in this embodiment of this application.

In addition, in this embodiment of this application, that $M_v$ is 2 is mainly used for description, and is also applicable to another case. For example, when $M_v$ is greater than 2, assuming that $M_v=3$ and N is 5, five consecutive candidate frequency domain components may be classified and combined to obtain six types of frequency domain components, and three bits are needed for indication. A first type of frequency domain component set is $\{(0, 1, 2), (1, 2, 3), (2, 3, 4)\}$, that is, three frequency domain components are adjacent. A second type of frequency domain component set is $\{(0, 1, 3, (1, 2, 4)\}$, that is, a first frequency domain component and a second frequency domain component are adjacent, and the second frequency domain component and a third frequency domain component are separated by one frequency domain component. A third type of frequency domain component set is $\{(0, 2, 3), (1, 3, 4)\}$, that is, the first frequency domain component and the second frequency domain component are separated by one frequency domain component, and the second frequency domain component and the third frequency domain component are adjacent. A fourth type of frequency domain component set is {(0, 2, 4)}, that is, the three frequency domain components are separated by two frequency domain components. A fifth type of frequency domain component set is {(0, 1, 4)}, that is, the first frequency domain component and the second frequency domain component are adjacent, and the second frequency domain component and the third frequency domain component are separated by three frequency domain components. A sixth type of frequency domain component set {(0, 3, 4)}, that is, the first frequency domain component and the second frequency domain component are separated by three frequency domain components, and the second frequency domain component and the third frequency domain component are adjacent.

The terminal device may report the index of the frequency domain component based on a codebook. In addition to reporting the parameter information of the index of the frequency domain component (used to determine the foregoing $W_f$), the terminal device may further report parameter information such as a selected port index (used to determine the foregoing $W_1$), a quantized weighting coefficient (including an amplitude and a phase of the weighting coefficient), and a location (used to determine the foregoing $W_2$) of each weighting coefficient in all non-zero coefficients. The terminal device may separately indicate parameter information corresponding to the $v^{th}$ layer (flow). However, in some cases, CSI feedback space allocated by the radio access network device to the terminal device may be insufficient, and consequently some parameter information needs to be discarded. Therefore, to feed back parameter information with high importance in a limited CSI feedback space, the NR protocol specifies a priority of each parameter information reported in the UCI.

In the technical specification of 3GPP Release R16, a reporting priority of the weighting coefficient (which is the amplitude, the phase, and a reporting priority of the location of the weighting coefficient in the codebook) may be indicated in the following form:

$$Pri(v, i, f) = 2 \cdot L \cdot V \cdot \pi(f) + V \cdot i + v$$

A larger value of Pri(v,i,f) indicates a lower priority of the weighting coefficient.

$$\pi(f) = \min(2 \cdot n_v^{(f)}, 2 \cdot (N_3 - n_v^{(f)}) - 1), l = 1,$$

$$2, \dots, 2L - 1, f = 0, 1, \dots < N - 1, v$$

indicates an index of a quantity of layers, a maximum index of the quantity of layers is V, i indicates an index of a port selected by the terminal device, a quantity of ports is 2L, f indicates an index of the frequency domain component selected by the terminal device, a quantity of candidate frequency domain components is N, a total quantity of frequency domain components is $N_3$, and $$n_v^{(f)}$$

is an index of the frequency domain component of the $v^{th}$ layer in a frequency domain component full set (which is a DFT codebook matrix in which the frequency domain component is located) after cyclic shift is performed.

A weighting coefficient corresponding to a minimum value of Pri(v,i,f) calculated in the foregoing formula is a strongest coefficient.

In the technical specification of 3GPP Release R16, the terminal device performs cyclic shift on the frequency domain component full set, to move a strongest frequency domain component to the start location, and an indication index of a corresponding frequency domain component is 0. Performing cyclic shift on the frequency domain component full set is equivalent to multiplying all frequency domain components in a full set by a same linear phase. In this way, correctness of precoding matrix calculation can be ensured.

However, in the technical specification of 3GPP Release R17, the terminal device does not perform cyclic shift on the frequency domain component full set. Therefore, when the weighting coefficient of the frequency domain component is the strongest coefficient, that an indication index corresponding to the strongest coefficient is 0 cannot be ensured, and that a priority is the highest cannot be ensured.

Based on this, in this embodiment of this application, the terminal device may send a strongest non-zero coefficient in the weighting coefficients corresponding to the $M_v$ frequency domain components. A priority of the strongest non-zero coefficient is the highest. For example, the terminal device may preferentially (or first) report the strongest non-zero coefficient, so that the priority of the strongest non-zero coefficient is the highest. The strongest non-zero coefficient may be carried in the UCI.

In the frequency domain component reporting method provided in this embodiment of this application, the terminal device may select and indicate the $M_v$ frequency domain components from the N candidate frequency domain components. Indication information indicating the $M_v$ frequency domain components occupies $$\left\lceil \log_2 \binom{N-1}{M_v - 1} \right\rceil$$

bits, and $M_v$ is a positive integer less than N. Therefore, feedback overheads of the frequency domain component can be reduced.

The following describes a possible manner of configuring a value of $M_v$ by the radio access network device.

In the NR protocol, a capability of the terminal device to support different codebooks is limited. In this embodiment of this application, the terminal device may send capability information of the terminal device to the radio access network device. The capability information of the terminal device includes a codebook combination supported by the terminal device, and the codebook combination is used to determine the value of $M_v$.

The codebook combination includes one or more types of codebooks supported by the terminal device. For example, the terminal device supports a maximum of three types of codebooks, and the codebook combination reported by the terminal device may be indicated as {codebook1, codebook2, codebook3}, or codebook1-codebook2-codebook3. Optionally, for each codebook combination, the terminal device further reports triplet information {a maximum quantity of ports of each resource, a maximum quantity of resources, a maximum total quantity of ports}. The maximum quantity of ports of each resource is a quantity of CSI-RS ports that are supported by each CSI-RS resource and that are configured by the radio access network device for the terminal device, the maximum quantity of resources is a maximum quantity of CSI-RS resources supported by the terminal device, and the maximum total quantity of ports is a total quantity of ports supported by the terminal device on all the CSI-RS resources. The maximum total quantity of ports supported by the terminal device are greater than or equal to the maximum quantity of ports of each resource multiplied by a maximum quantity of resources. In some cases, the radio access network device may configure the maximum quantity of resources for the terminal device.

The radio access network device sends second indication information to the terminal device. The second indication information indicates the value of $M_v$. For example, the radio access network device selects, from one or more types of codebooks supported by the terminal device, a type of codebook including a $M_v$ parameter, and then sends a value of $M_v$ corresponding to the type of codebook.

Considering that a processing complexity of the terminal device is related to the port, and the processing complexity of the terminal device is also related to the value of $M_v$. Optionally, the capability information of the terminal device may further include a maximum value of $M_v$ supported by the terminal device. In this way, the radio access network device selects the value of $M_v$ from the maximum value of $M_v$ supported by the terminal device for indication. In other words, the value of $M_v$ indicated by the second indication information is less than or equal to the maximum value of $M_v$. The radio access network device selects the value of $M_v$ for the terminal device based on the maximum value of $M_v$ supported by the terminal device, so that the processing complexity of the terminal device can be controlled.

In a possible manner, the terminal device may report the maximum value of $M_v$ when reporting a triplet, for example, combine the triplet and the maximum value of $M_v$ to form a quadruplet {the maximum number of ports of each resource, the maximum quantity of resources, the maximum total quantity of ports, the maximum value of $M_v$}. The processing complexity of the terminal device may be controlled by carrying the maximum value of $M_v$ in the quadruplet.

Currently, the technical specification of 3GPP Release R16 supports limited codebook types. In this embodiment of this application, a new codebook type FeType2 is proposed, so that the terminal device can select a supported codebook type from more codebook types.

The terminal device may add the codebook type FeType2 to a codebook list combination specified in an existing standard protocol, that is, add a codebook combination including FeType2. Value information of $M_v$ reflected in the codebook type FeType2 can enrich a selection range of the codebook type, or the processing complexity of the terminal device may be controlled by using the value information of $M_v$. For example, the codebook combination that is reported by the terminal and that carries the newly added codebook type FeType2 may be indicated in one or more of the following forms.

type1SP-FeType2Mv1-null;
type1SP-FeType2Mv2-null;
type1SP-FeType2-null;
type1SP-eType2R1-FeType2Mv1;
type1SP-eType2R2-FeType2Mv1;
type1SP-eType2R1-FeType2Mv2;
type1SP-eType2R2-FeType2Mv2;
type1SP-eType2R1-FeType2;
type1SP-eType2R2-FeType2;
type1MP-FeType2Mv1-null;
type1MP-FeType2Mv2-null;

type1MP-FeType2-null;
type1MP-eType2R1-FeType2Mv1;
type1MP-eType2R2-FeType2Mv1;
type1MP-eType2R1-FeType2Mv2;
type1MP-eType2R2-FeType2Mv2;
type1MP-eType2R1-FeType2; or
type1MP-eType2R2-FeType2.

The SP is a single panel, and the MP is a multi-panel (multi-panel). Mv1 indicates that the value of $M_v$ is 1, and Mv2 indicates that the value of $M_v$ is 2. E indicates enhanced, and Fe indicates further enhanced. R1 indicates that each subband CQI corresponds to one subband PMI, and R2 indicates that each subband CQI corresponds to two subband PMIs. Null is empty, which means that the terminal device supports another (non-null) codebook type in the codebook combination.

After receiving the codebook combination and an optional value range of $M_v$ that are sent by the terminal device, the radio access network device may determine the value of $M_v$. In a possible manner, the third indication information indicates the value of $M_v$ by indicating a selected codebook type. For example, the third indication information indicates a codebook type FeType2Mv1, representing that the value of $M_v$ supported by the terminal device in a codebook of a FeType2 type is 1. For another example, the third indication information indicates a codebook type FeType2Mv2, representing that the value of $M_v$ supported by the terminal device in the codebook of the FeType2 type is 2. For another example, the third indication information indicates the codebook type FeType2, representing that the terminal device supports all possible values of $M_v$ by default in the codebook of the FeType2 type.

Figure 5:
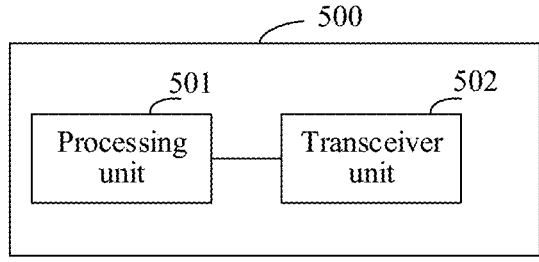
FIG. 5 is a schematic diagram of a structure of a communication apparatus according to an embodiment of this application.

Based on a same technical concept as the foregoing frequency domain component reporting method, an embodiment of this application further provides a communication apparatus. As shown in FIG. 5, a communication apparatus 500 includes a processing unit 501 and a transceiver unit 502. The communication apparatus 500 may be configured to implement the method described in the foregoing method embodiment. The apparatus 500 may be used in a terminal device or a radio access network device, or may be located in the terminal device or the radio access network device.

In a possible embodiment, the apparatus 500 is the terminal device.

For example, the processing unit 501 is configured to determine $M_v$ frequency domain components. The $M_v$ frequency domain components are a subset of N candidate frequency domain components, $M_v$ is a positive integer, and N is a positive integer greater than $M_v$.

The transceiver unit 502 is configured to send first indication information. The first indication information indicates the $M_v$ frequency domain components, and the first indication information occupies $$\left\lceil \log_2 \binom{N-1}{M_v-1} \right\rceil$$

bits.

In an implementation, $M_v$ is 2.

In an implementation, N is one of 3, 4, or 5.

In an implementation, the N candidate frequency domain components include a plurality of types of frequency domain component sets, frequency domain component subsets in a same type of frequency domain component set are equivalent for reconstructing a precoding matrix by the radio access network device, and each frequency domain component set includes the $M_v$ frequency domain components.

In an implementation, when N is 3, the first indication information indicates two frequency domain components using one bit, and one of the frequency domain components is a frequency domain component at a start location or an end location of the N candidate frequency domain components;

the first indication information indicates two frequency domain components using one bit, and one of the frequency domain components is a frequency domain component of a specified value; or the first indication information indicates each type of frequency domain component set using one bit.

In an implementation, when N is 4 or 5, the first indication information indicates two frequency domain components using two bits, and one of the frequency domain components is a frequency domain component at a start location or an end location of the N candidate frequency domain components;

the first indication information indicates two frequency domain components using two bits, and one of the frequency domain components is a frequency domain component of a specified value; or the first indication information indicates each type of frequency domain component set using two bits.

In an implementation, the first indication information is carried in precoding matrix indication information.

In an implementation, the first indication information is carried in the PMI information, and the PMI information is carried in UCI.

In an implementation, the transceiver unit 502 is further configured to send a strongest non-zero coefficient in weighting coefficients corresponding to the $M_v$ frequency domain components. A priority of the strongest non-zero coefficient is the highest.

For another example, the transceiver unit 502 is configured to: report capability information of the terminal device, where the capability information of the terminal device includes a codebook combination supported by the terminal device, and the codebook combination is used to determine a value of $M_v$; and receive second indication information. The second indication information indicates the value of $M_v$.

The processing unit 501 is configured to determine the value of $M_v$.

In an implementation, the capability information of the terminal device further includes a maximum value of $M_v$ supported by the terminal device, and the value of $M_v$ indicated by the second indication information is less than or equal to the maximum value of $M_v$.

In an implementation, the codebook combination includes one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

In another possible embodiment, the apparatus 500 is the radio access network device.

For example, the transceiver unit 502 is configured to receive first indication information. The first indication information indicates $M_v$ frequency domain components, the $M_v$ frequency domain components are a subset of N candidate frequency domain components, the first indication information occupies $$\left\lceil \log_2 \binom{N-1}{M_v - 1} \right\rceil$$

bits, $M_v$ is a positive integer, and N is a positive integer greater than $M_v$.

The processing unit 501 is configured to determine the $M_v$ frequency domain components.

In an implementation, $M_v$ is 2.

In an implementation, N is one of 3, 4, or 5.

In an implementation, the N candidate frequency domain components include a plurality of types of frequency domain component sets, frequency domain component subsets in a same type of frequency domain component set are equivalent for reconstructing a precoding matrix by the radio access network device, and each frequency domain component subset includes the $M_v$ frequency domain components.

In an implementation, when N is 3, the first indication information indicates two frequency domain components using one bit, and one of the frequency domain components is a frequency domain component at a start location or an end location of the N candidate frequency domain components;

the first indication information indicates two frequency domain components using one bit, and one of the frequency domain components is a frequency domain component of a specified value; or the first indication information indicates each type of frequency domain component set using one bit.

In an implementation, when N is 4 or 5, the first indication information indicates two frequency domain components using two bits, and one of the frequency domain components is a frequency domain component at a start location or an end location of the N candidate frequency domain components;

the first indication information indicates two frequency domain components using two bits, and one of the frequency domain components is a frequency domain component of a specified value; or the first indication information indicates each type of frequency domain component set using two bits.

In an implementation, the first indication information is carried in precoding matrix indication information.

In an implementation, the first indication information is carried in the PMI information, and the PMI information is carried in UCI.

In an implementation, the transceiver unit 502 is further configured to receive a strongest non-zero coefficient in weighting coefficients corresponding to the $M_v$ frequency domain components. A priority of the strongest non-zero coefficient is the highest.

For another example, the transceiver unit 502 is configured to receive capability information of the terminal device. The capability information of the terminal device includes a codebook combination supported by the terminal device, and the codebook combination is used to determine a value of $M_v$.

The processing unit 501 is configured to determine the value of $M_v$.

The transceiver unit 502 is further configured to send second indication information. The second indication information indicates the value of $M_v$.

In an implementation, the capability information of the terminal device further includes a maximum value of $M_v$ supported by the terminal device, and the value of $M_v$ indicated by the second indication information is less than or equal to the maximum value of $M_v$.

In an implementation, the codebook combination includes one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

It should be noted that in embodiments of this application, division into modules is an example, and is only a logical function division. During actual implementation, there may be another division manner. In addition, functional units in embodiments of this application may be integrated into one processing unit, or may exist alone physically, or two or more units are integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the integrated unit may be stored in a storage medium as a computer software product, and includes several instructions for enabling a computer device (which may be a personal computer, a server, or the radio access network device) or a processor to perform all or a part of the operations of the methods in embodiments of this application.

Figure 6:
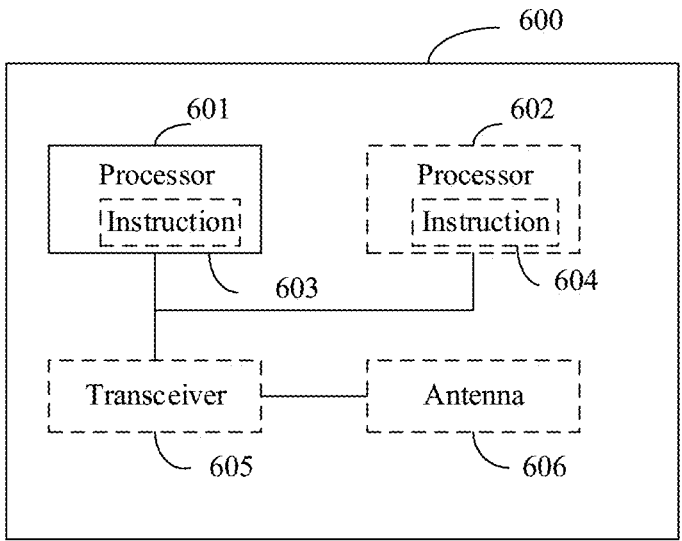
FIG. 6 is a schematic diagram of a structure of a communication apparatus according to an embodiment of this application.

As shown in FIG. 6, an embodiment of this application further provides a schematic diagram of a structure of a communication apparatus 600. The apparatus 600 may be configured to implement the method described in the foregoing method embodiment. For details, refer to descriptions in the foregoing method embodiments.

The apparatus 600 includes one or more processors 601. The processor 601 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a terminal, or a chip); execute a software program; and process data of the software program. The communication apparatus may include a transceiver unit, configured to input (receive) and output (send) signals. For example, the transceiver unit may be a transceiver or a radio frequency chip.

The apparatus 600 includes the one or more processors 601, and the one or more processors 601 may implement the method in the foregoing embodiments.

Optionally, the processor 601 may further implement another function in addition to the method in the foregoing embodiments.

Optionally, in a design, the processor 601 may execute instructions, so that the apparatus 600 performs the method described in the foregoing method embodiments. All or a part of the instructions may be stored in the processor, for example, an instruction 603; or may be stored in a memory

602 coupled to the processor, for example, an instruction 604. The instruction 603 and 604 may be alternatively used together to enable the communication apparatus 600 to perform the method described in the foregoing method embodiments. The instruction 603 is also referred to as a computer program.

In another possible design, the communication apparatus 600 may further include a circuit, and the circuit may implement a function in the foregoing method embodiments.

In another possible design, the apparatus 600 may include one or more memories 602 storing the instruction 604. The instruction may be run on the processor, so that the apparatus 600 performs the method described in the foregoing method embodiments. Optionally, the memory may further store data. Optionally, the processor may also store instructions and/or data. For example, the one or more memories 602 may store the correspondence described in the foregoing embodiments, or the related parameter, table, or the like in the foregoing embodiments. The processor and the memory may be separately disposed, or may be integrated with each other.

In another possible design, the apparatus 600 may further include a transceiver 605 and an antenna 606. The processor 601 may be referred to as a processing unit, and is configured to control the apparatus (the terminal or the base station). The transceiver 605 may be referred to as a transceiver, a transceiver circuit, the transceiver unit, or the like, and is configured to implement a transceiver function of the apparatus by using the antenna 606.

The processor may be a general-purpose central processing unit (CPU), a microprocessor, an application-specific integrated circuit (ASIC), one or more integrated circuits configured to control program execution of the solutions of this application, a general-purpose processor, a digital signal processor (DSP), a field programmable gate array (FPGA) or another programmable logic device, a discrete gate or transistor logic device, or a discrete hardware component. It may implement or perform the methods, the operations, and logical block diagrams that are disclosed in embodiments of this application. The general-purpose processor may be the microprocessor, or the processor may be any conventional processor or the like. Steps of the methods disclosed with reference to embodiments of this application may be directly executed and accomplished by using a hardware decoding processor, or may be executed and accomplished by using a combination of hardware and software modules in the decoding processor. The software module may be in the storage medium, and the storage medium is located in a memory.

The memory may be a volatile memory or a nonvolatile memory, or may include the volatile memory and the nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another proper type. The memory may exist independently, and is connected to the processor through a communication line. The memory may alternatively be integrated with the processor.

Figure 7:
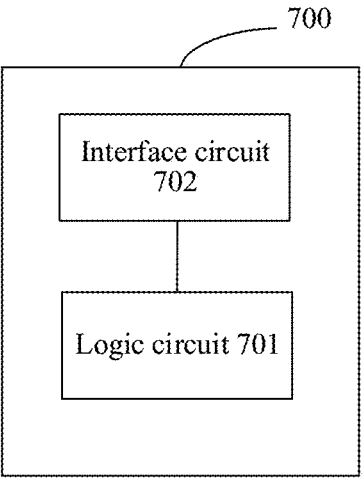
FIG. 7 is a schematic diagram of a structure of a communication apparatus according to an embodiment of this application.

It may be understood that the structure in FIG. 7 does not constitute a specific limitation on the terminal device and the radio access network device. In some other embodiments of this application, the terminal device or radio access network device may include more or fewer components than those shown in the figure, or combine some components, or split some components, or have different component arrangements. The components shown in the figure may be implemented by hardware, software, or a combination of software and hardware.

An embodiment of this application further provides a computer-readable medium. The computer-readable medium stores a computer program. When the computer program is executed by a computer, the frequency domain component reporting method in any one of the foregoing method embodiments is implemented.

An embodiment of this application further provides a computer program product, including a computer program. When the computer program is executed by a computer, the frequency domain component reporting method in any one of the foregoing method embodiments is implemented.

An embodiment of this application further provides a communication system, including a terminal device and a radio access network device. The terminal device and the radio access network device may implement the frequency domain component reporting method in any one of the foregoing method embodiments.

All or a part of the foregoing embodiments may be implemented by software, hardware, firmware, or any combination thereof. When software is used to implement embodiments, all or a part of embodiments may be implemented in a form of a computer program product. The computer program product includes one or more computer instructions. When the computer instructions are loaded and executed on a computer, the procedure or functions according to embodiments of this application are all or partially generated. The computer may be the foregoing communication apparatus. The computer instructions may be stored in a computer-readable storage medium or may be transmitted from a computer-readable storage medium to another computer-readable storage medium. The computer-readable storage medium may be the foregoing storage medium or the foregoing memory.

In a possible design, when the communication apparatus is a chip, for example, a chip in the radio access network device, or a chip in the terminal device, a determining unit or the processor 601 may be one or more logic circuits, and a sending unit or a receiving unit or the transceiver 605 may be an input/output interface, or may be referred to as a communication interface, an interface circuit, an interface, or the like. Alternatively, the transceiver 605 may be the sending unit and the receiving unit. The sending unit may be an output interface, and the receiving unit may be an input interface. The sending unit and the receiving unit are integrated into one unit, for example, the input/output interface. As shown in FIG. 7, a communication apparatus 700 includes a logic circuit 701 and an interface circuit 702. That is, the determining unit or the processor 601 may be implemented by using the logic circuit 701, and the sending unit or the receiving unit or the transceiver 605 may be implemented by using the interface circuit 702. The logic circuit

701 may be a chip, a processing circuit, an integrated circuit, a system on chip (SoC), or the like, and the interface circuit 702 may be a communication interface, an input/output interface, or the like. In this embodiment of this application, the logic circuit may further be coupled to the interface. A specific connection manner of the logic circuit and the interface is not limited in this embodiment of this application.

In some embodiments of this application, the logic circuit and the interface circuit may be configured to perform functions, operations, or the like performed by the radio access network device or the terminal device.

For example, the logic circuit 701 is configured to determine $M_v$ frequency domain components.

The interface circuit 702 is configured to send first indication information. The first indication information indicates the $M_v$ frequency domain components, and the first indication information occupies $$\left\lceil \log_2 \binom{N-1}{M_v - 1} \right\rceil$$

bits.

For functions or operations performed by the radio access network device or the terminal device, refer to the foregoing method embodiments. Details are not described herein again.

A person of ordinary skill in the art may be aware that, in combination with the examples described in embodiments disclosed in this specification, units and algorithm operations can be implemented by electronic hardware, computer software, or a combination thereof. To clearly describe the interchangeability between the hardware and the software, the foregoing has generally described compositions and operations of each example based on functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, in other words, may be located in one position, or may be distributed on a plurality of network units. A part or all of the units may be selected according to actual requirements to achieve the purposes of the solutions of embodiments in this application.

In addition, function units in embodiments of this application may be integrated into one processing unit, each of the units may exist alone physically, or two or more units may be integrated into one unit. The integrated unit may be implemented in a form of hardware, or may be implemented in a form of a software functional unit.

With descriptions of the foregoing implementations, a person skilled in the art may clearly understand that this application may be implemented by hardware, firmware, or a combination thereof. When embodiments of the present application are implemented by software, the foregoing functions may be stored in a computer-readable medium or transmitted as one or more instructions or code in the computer-readable medium. The computer-readable medium includes a computer storage medium and a communication medium. The communication medium includes any medium that enables a computer program to be transmitted from one place to another. The storage medium may be any available medium accessible to a computer.

In summary, what is described above is merely embodiments of the technical solutions of this application, but is not intended to limit the protection scope of this application. Any modification, equivalent replacement, improvement, or the like made without departing from the principle of this application shall fall within the protection scope of this application.

What is claimed is:

1. A method, comprising:
obtaining $M_v$ frequency domain components, wherein the $M_v$ frequency domain components are a subset of N consecutive candidate frequency domain components, one of the $M_v$ frequency domain components is a frequency domain component at a start location of the N consecutive candidate frequency domain components, the start location of the N consecutive candidate frequency domain components is a start location of $N_3$ candidate frequency domain components, $M_v$ is a positive integer, N is a positive integer greater than $M_v$, and $N_3$ is a quantity of frequency domain resource block (RB) resources or a quantity of subbands in a bandwidth part (BWP) supported by a terminal device; and
sending first indication information, wherein the first indication information indicates the $M_v$ frequency domain components, and the first indication information occupies $$\left\lceil \log_2 \binom{N-1}{M_v - 1} \right\rceil$$

bits.

2. The method according to claim 1, wherein $M_v$ is 2.

3. The method according to claim 1, wherein, in response to N being equal to 4, the first indication information indicates two selected frequency domain components using two bits.

4. The method according to claim 3, wherein
in response to a value of the two bits being 00, the first indication information indicates reported frequency domain component 1;

in response to the value of the two bits being 01, the first indication information indicates reported frequency domain component 2; and
in response to the value of the two bits being 10, the first indication information indicates reported frequency domain component 3.

5. The method according to claim 1, further comprising, before obtaining the $M_v$ frequency domain components:
reporting capability information of the terminal device, wherein the capability information of the terminal device comprises a codebook combination supported by the terminal device, and the codebook combination is used to determine a value of $M_v$; and
receiving second indication information, wherein the second indication information indicates the value of $M_v$.

6. The method according to claim 5, wherein:
the capability information of the terminal device further comprises a maximum value of $M_v$ supported by the terminal device; and
the value of $M_v$ indicated by the second indication information is less than or equal to the maximum value of $M_v$.

7. The method according to claim 5, wherein the codebook combination comprises one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

8. A communication apparatus, comprising:
at least one processor configured with processor-executable instructions to perform operations comprising:
obtaining $M_v$ frequency domain components, wherein the $M_v$ frequency domain components are a subset of N consecutive candidate frequency domain components, one of the $M_v$ frequency domain components is a frequency domain component at a start location of the N consecutive candidate frequency domain components, the start location of the N consecutive candidate frequency domain components is a start location of $N_3$ candidate frequency domain components, $M_v$ is a positive integer, N is a positive integer greater than $M_v$, and $N_3$ is a quantity of frequency domain resource block (RB) resources or a quantity of subbands in a bandwidth part (BWP) supported by a terminal device; and
sending first indication information, wherein the first indication information indicates the $M_v$ frequency domain components, and the first indication information occupies $$\left\lceil \log_2 \binom{N-1}{M_v - 1} \right\rceil$$

bits.

9. The communication apparatus according to claim 8, wherein $M_v$ is 2.

10. The communication apparatus according to claim 8, wherein in response to N being equal to 4, the first indication information indicates two selected frequency domain components using two bits.

11. The communication apparatus according to claim 10, wherein in response to a value of the two bits being 00, the first indication information indicates reported frequency domain component 1;

in response to the value of the two bits being 01, the first indication information indicates reported frequency domain component 2; and in response to the value of the two bits being 10, the first indication information indicates reported frequency domain component 3.

12. The communication apparatus according to claim 8, wherein the at least one processor is configured with processor-executable instructions to further perform operations comprising:

reporting capability information of the terminal device, wherein the capability information of the terminal device comprises a codebook combination supported by the terminal device, and the codebook combination is used to determine a value of $M_v$; and receiving second indication information, wherein the second indication information indicates the value of $M_v$.

13. The communication apparatus according to claim 12, wherein:

the capability information of the terminal device further comprises a maximum value of $M_v$ supported by the terminal device; and the value of $M_v$ indicated by the second indication information is less than or equal to the maximum value of $M_v$.

14. The communication apparatus according to claim 12, wherein the codebook combination comprises one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

15. A non-transitory computer-readable storage medium with computer instructions stored thereon, wherein the computer instructions, when executed by at least one processor, cause the at least one processor to perform at least following operations:

obtaining $M_v$ frequency domain components, wherein the $M_v$ frequency domain components are a subset of N consecutive candidate frequency domain components, one of the $M_v$ frequency domain components is a frequency domain component at a start location of the N consecutive candidate frequency domain components, the start location of the N consecutive candidate frequency domain components is a start location of $N_3$ candidate frequency domain components, $M_v$ is a positive integer, N is a positive integer greater than $M_v$, and $N_3$ is a quantity of frequency domain resource block (RB) resources or a quantity of subbands in a bandwidth part (BWP) supported by a terminal device; and sending first indication information, wherein the first indication information indicates the $M_v$ frequency domain components, and the first indication information occupies $$\left\lceil \log_2 \binom{N-1}{M_v-1} \right\rceil$$

bits.

16. The non-transitory computer-readable storage medium according to claim 15, wherein $M_v$ is 2.

17. The non-transitory computer-readable storage medium according to claim 15, wherein, in response to N being equal to 4, the first indication information indicates two selected frequency domain components using two bits.

18. The non-transitory computer-readable storage medium according to claim 17, wherein in response to a value of the two bits being 00, the first indication information indicates reported frequency domain component 1;

in response to the value of the two bits being 01, the first indication information indicates reported frequency domain component 2; or in response to the value of the two bits being 10, the first indication information indicates reported frequency domain component 3.

19. The non-transitory computer-readable storage medium according to claim 15, wherein the computer instructions, when executed by at the least one processor, cause the at least one processor to further perform at least following operations:

reporting capability information of the terminal device, wherein the capability information of the terminal device comprises a codebook combination supported by the terminal device, and the codebook combination is used to determine a value of $M_v$; and receiving second indication information, wherein the second indication information indicates the value of $M_v$.

20. The non-transitory computer-readable storage medium according to claim 19, wherein:

the capability information of the terminal device further comprises a maximum value of $M_v$ supported by the terminal device;

and the value of $M_v$ indicated by the second indication information is less than or equal to the maximum value of $M_v$.

21. The non-transitory computer-readable storage medium according to claim 19, wherein the codebook combination comprises one or more of the following: type1SP-FeType2Mv1-null, type1SP-FeType2Mv2-null, type1SP-FeType2-null, type1SP-eType2R1-FeType2Mv1, type1SP-eType2R2-FeType2Mv1, type1SP-eType2R1-FeType2Mv2, type1SP-eType2R2-FeType2Mv2, type1SP-eType2R1-FeType2, type1SP-eType2R2-FeType2, type1MP-FeType2Mv1-null, type1MP-FeType2Mv2-null, type1MP-FeType2-null, type1MP-eType2R1-FeType2Mv1, type1MP-eType2R2-FeType2Mv1, type1MP-eType2R1-FeType2Mv2, type1MP-eType2R2-FeType2Mv2, type1MP-eType2R1-FeType2, or type1MP-eType2R2-FeType2.

* * * * *